United States Patent [19]

Santurtûn et al.

[11] Patent Number: 4,654,770

[45] Date of Patent: Mar. 31, 1987

[54] CURRENT-LIMIT CIRCUIT IN X-RAY GENERATOR

[75] Inventors: Carlos M. Santurtûn; Angel D. Carmena, both of Madrid, Spain

[73] Assignee: General Electric Company, Milwaukee, Wis.

[21] Appl. No.: 564,622

[22] Filed: Dec. 22, 1983

[51] Int. Cl.[4] .............................................. H02H 7/122

[52] U.S. Cl. ........................................ 363/17; 361/93; 363/56; 378/110

[58] Field of Search ........................ 363/17, 55, 56, 98; 378/101, 103, 104, 106, 109, 110; 361/87, 96, 93, 97

[56] References Cited

U.S. PATENT DOCUMENTS

| | | | |
|---|---|---|---|
| 3,567,940 | 3/1971 | Lambert | 250/102 |
| 4,012,669 | 3/1977 | Gelfand et al. | 361/97 |
| 4,221,968 | 9/1980 | Franke | 250/402 |
| 4,301,498 | 11/1981 | Farrer | 363/17 |
| 4,309,612 | 1/1982 | Aichinger | 250/409 |
| 4,317,039 | 2/1982 | Romandi | 250/418 |
| 4,322,625 | 3/1982 | Daniels et al. | 250/409 |
| 4,344,122 | 8/1982 | Jones | 363/23 |
| 4,348,590 | 9/1982 | Daniels et al. | 378/112 |
| 4,361,901 | 11/1982 | Daniels et al. | 378/106 |
| 4,375,105 | 2/1983 | Baumann | 378/92 |
| 4,377,002 | 3/1983 | Krause et al. | 378/93 |

FOREIGN PATENT DOCUMENTS

| | | | |
|---|---|---|---|
| 47957 | 3/1982 | European Pat. Off. | 363/17 |
| 2724741 | 12/1978 | Fed. Rep. of Germany | 363/56 |
| 114212 | 7/1983 | Japan | 363/17 |

OTHER PUBLICATIONS

Walter Weigl, "A New High-Frequency Controlled X-Ray Generator System with Multi-Pulse Wave Shape", Jun. 1983, pp. 7-19 in *The Journal for Radiological Engineering,* vol. 1, No. 1, Jun. 1983.

*Primary Examiner*—William H. Beha, Jr.

*Attorney, Agent, or Firm*—Duckworth, Allen & Dyer

[57] ABSTRACT

Current limit protection is provided to ensure that the current flow within the transistor inverter does not exceed a predetermined safe level to thereby cause damage to the various components such as the transistor inverters. The current in the primary of the transformer is sensed and a representative signal is compared with a reference signal to provide a digital output indicating whether a safe limit has been exceeded. A logic network then operates on the output signal to shut down or reduce the system operation accordingly. In the event of a shut-down, current decay is accommodated by shutting off only the top transistors in the inverter diagonals so as to thereby allow the remaining current to flow in the bottom transistors and diodes.

3 Claims, 18 Drawing Figures

CURRENT-LIMIT CIRCUIT IN X-RAY GENERATOR

CROSS REFERENCE TO RELATED APPLICATIONS

This application is related to the following commonly assigned, concurrently filed U.S. applications: Ser. No. 564,538, entitled "X-Ray Generator With Voltage Feedback Control," now abandoned; Ser. No. 564,603, entitled "Protective Circuit for X-Ray Generator" now U.S. Pat. No. 4,601,051; Ser. No. 564,582, entitled "Antisaturation Control for X-Ray Generator Inverter"; Ser. No. 564,550, entitled "High-Voltage Bleeder for X-Ray Generator" now abandoned; and Ser. No. 564,621 entitled "X-Ray Generator With Phase-Advance Voltage Feedback," now U.S. Pat. No. 4,596,029.

BACKGROUND OF THE INVENTION

This invention relates generally to high-voltage generation systems for use with X-ray tubes and, more particularly, to a circuit for limiting the current flow in an X-ray generator system.

It is common in the generation and use of X-rays to select a particular voltage and current level to fit the particular application or procedure at hand. For example, in the field of medical X-ray imaging, a typical voltage level that may be applied in conventional radiography might be in the range of 50 kv to 150 kv, whereas in a fluorographic application the voltage is more likely to be in the 50 kV to 120 kV range, and for use in mammographic X-ray applications it is more likely to be in the range between 24 kV and 50 kV. Similarly, the level of current which is applied may vary from 0.1 mA for fluorographic applications to 1250 mA for certain radiographic procedures. Traditionally, these voltage and current levels have been controlled by the use of circuit design features which allow the operator to preset the desired kVp and mA settings that were desired. Because of system variations which can occur during an exposure, such as, for example, a change in the load, a change in the line voltage, or a change in the filament temperature, it has been impossible to precisely maintain the kVp and mA values at the preferred levels. The manufacturers of X-ray generators have traditionally tried to anticipate the changes that may occur and to incorporate circuit design features which would compensate for those variations in a manner sufficient to hold the kVp and mA within predetermined tolerances.

Recent developments have occurred along the lines of a closed-loop feedback system which would overcome the disadvantages of the open-loop system discussed above. One such system is that for a closed-loop feedback system to control mA in an X-ray generator system. This system is described in U.S. patent application No. 375,088, filed on May 5, 1982 and assigned to the assignee of the present invention.

In the area of kVp control, there has been no development of a satisfactory closed-loop system which senses the output voltage and uses that feedback signal to directly modulate the output voltage in a quick, effective, and responsive manner to maintain a predetermined voltage level.

The conventional approach for maintaining a substantially constant voltage level with the variations that may occur in the line is to use the so-called volt-pac which is a variable input/output autotransformer driven by a motor to obtain a variable output. A primary disadvantage of the volt-pac is that it is relatively slow in operation, i.e., the volt-pac has a response time of about 1 second. For this reason, the volt-pac control is used only to set up the correct voltages at the start of exposure and is not thereafter adjusted except during long (i.e., fluoroscopic) exposures. This is to be compared with a desired response time in the millisecond range for an X-ray generator system which is able to provide a short power pulse of good definition for a large variety of procedures and applications. For example, it is desirable to have a high-voltage pulse with a very quick rise time, i.e., as short as 1 millisecond, a flat peak for an exposure as short as 1 millisecond, and a quick fall time. Hence, corrections need to be accomplished in less than one millisecond.

The use of an inverter in an X-ray generator circuit to provide an alternating current to the primary of a high-voltage transformer is known. However, due primarily to the fact that they are relatively difficult to control, transistors have generally not been used for this purpose. Rather, it has been the thyristor which has been used for the switching device in these applications. Although thyristors are considered to be generally rugged and relatively easy to control, they have the inherent disadvantage of requiring the use of forced commutating circuitry. Thus, not only is there a need for extra components, but also, the added capacitance tends to substantially slow down the response time of the circuit. For example, when using a thyristor inverter, it would be difficult to obtain a short, high-voltage pulse in the range of 1 msec. duration while at the same time maintaining a reasonable level of reproducibility.

For the control of the a.c. output from an inverter, there are a number of possible techniques for controlling the d.c. voltage supply to the inverter: phase-controlled rectifiers, transistor series or shunt regulators; and semi-conductor switching-type d.c. voltage controls, to name a few. Of these, the semi-conductor switching device commonly known as the chopper can generally provide more efficient and faster response d.c. voltage controls than the other techniques. However, because of the substantial filtering requirement in the d.c. circuit, it is much too slow in response time for operation in a complete closed-loop voltage regulated inverter power supply. With such an indirect approach, there are further circuit losses that are caused by the forced commutation circuitry that must be used to accommodate the large voltage and current variations that are necessary in the operation of an X-ray generation system. Moreover, with such an arrangement, it will be recognized that the power delivered by the inverter is handled twice, once by the d.c. voltage control and once by the inverter.

In addition to the inherent variations that occur in the source and in the load, there are also certain, occasional, unplanned conditions, such as an arc in the tube, which occur on the high voltage side which, if not controlled, may lead to harm to the components. Further, in any control network, there is a possibility of malfunction or failure in the low voltage control circuitry which, if not detected and attended to, may cause undesirable consequences at the output or within the control network itself. Thus, with any control or performance-enhancing features that may be added to a conventional system, there are related monitoring and regulating features which must be provided to accommodate these enhancements. Accordingly, in the field of X-ray generators for use in medical diagnostic equipment, there has been a reluctance to introduce any significant change to conventional systems.

Although it has long been the desire of X-ray-generation manufacturers to provide a closed-loop voltage feedback system, the typical requirements for X-ray applications (i.e., variable loads in the range of 0.1–1250 mA, variable voltages in the range of 24–150 kVp, and mAs as low as 0.25), a suitable such system has been difficult to make. The task is made more difficult by the various performance requirements such as good ripple control, high reproducibility, good linearity, and a controlled shape of the power waveform with a fast rise time, a steady-state, short exposure time, and a short fall time.

In addition to the occurrence of over-voltages in the system, it will be recognized that there may also be excessive current levels in the system which could cause damage to the X-ray tube itself or to the high-voltage or low-voltage components within the system. When using an inverter in an X-ray generator system, it is desirable to have as much current as possible going through the switching devices. However, in order to maintain a reasonable life for those switching devices, it is imperative that the current level not exceed a predetermined level. The function of determining when the current level is coming close to its limit and for taking the necessary action to prevent that occurrence can be difficult to accomplish. This is especially true when an inverter is operating at higher frequencies.

OBJECTS OF THE PRESENT INVENTION

It is, therefore, a primary object of the present invention to provide an improved X-ray generator system with means for controlling the output voltage to be applied to an X-ray tube by way of a closed-loop circuit.

Another object of the present invention is the provision in an X-ray generator system for a closed-loop voltage feedback loop which is effective for rapidly and accurately responding to fluctuations in the input voltage and in the load so as to maintain the desired voltage output.

Yet another object of the present invention is the provision in an X-ray generator system for a control network which is sufficiently fast and responsive over a wide range of operating conditions to provide a generated power pulse having a rapid rise time followed by a relatively short exposure time of substantially constant voltage, and a relatively fast fall time.

Still another object of the present invention is the provision in an X-ray generator system for operating at relatively high current levels while at the same time ensuring that the current level does not exceed a safe limit which would cause damage to the system components.

These objects and other features and advantages will become more readily apparent upon reference to the following description when taken in conjunction with the appended drawings.

SUMMARY OF THE INVENTION

Briefly, in accordance with one aspect of the invention, an X-ray generation system is provided with a high-voltage feedback from the tube, and a control network which is responsive to that feedback to control the operation of the system inverter in such a way as to maintain a predetermined voltage level to the X-ray tube. In this way, the feedback signal is applied to directly control the output of the inverter so that the system can quickly and accurately respond to variations in both the line voltage and the load. The cooperating components, such as the high-voltage transformer, high-voltage output filter, and high-voltage bleeder circuitry, are designed to be compatible with, and contribute to, the quick response features of the system. The resulting control network provides a system which is capable of providing to the X-ray tube a high voltage output which has: a rise time as short as one millisecond; a steady-state, high-voltage period as short as one millisecond with minimal ripple; and a fast fall time, particularly for very low mAs such as 0.25 mAs.

By another aspect of the invention, a transistor inverter operating at relatively high frequencies (i.e., in the range of several kilohertz) is adapted to provide a square wave, pulse-width-modulated output whose rectified output voltage level is controlled by selectively varying, not only the mark/space ratio, but also the frequency of the output waveform. The inverter is controlled in response to: operator settings; the output voltage feedback; and to generated signals representative of certain operating conditions of the system.

Another aspect of the invention relates to the sensing of a saturating condition in the transformer core and for responsively initiating corrective action to alleviate the problem. Means are provided to sense the current in the transformer and to integrate the resulting signal to obtain an indication of an approaching core-saturation condition. The signal is then applied to a sawtooth generator to generate control signals which act to selectively unbalance the current flow in the two diagonals in such a way as to alleviate the saturating condition.

In the voltage feedback loop, a phase-advance network is included to dynamically vary the gain of the system in such a way as to provide for a high gain during the initial stage so as to obtain a short rise time, while subsequently reducing the gain so as to clamp the kV overshoot at the end of the rise time. This effect is provided by applying the voltage feedback signal to a phase-advance circuit prior to its being applied to the voltage demand signal at the input to an amplifier. The attendant noise that is introduced by the phase-advance network is alleviated by a phase-lag network which is provided in the feedback loop of the amplifier.

A high-voltage divider circuit is provided to obtain a low-voltage control signal representative of the output voltage for use in the control network. Instead of adding a separate capacitor for the high-voltage portion of the divider, the filter capacitor is used for that purpose and, as such, is useful in a dual-purpose mode. This leads to a substantial reduction in the number of components and, when used with the present high frequency pulse-width-modulated output, provides a closed-loop voltage-feedback system with good transient response.

In order to protect the system from undesirable conditions which may result from possible malfunctions, voltage spikes, flash-overs, and the like, a microprocessor is incorporated to monitor the system and, on the basis of status signals which it receives, to modulate the system operation and/or shut down the system accordingly. Some of the specific conditions against which the protection system acts to reduce, prevent, or stop the system operation are: over-voltage at the output, unbalance between the anode and the cathode with respect to ground, excessive current flow, and excess of kilovolt uncontrolled demand. Provision is also made to begin timing of X-ray exposures only after the output voltage level has reached 75% of the demand or equipment set point, thereby ensuring improved performance, and meeting prescribed regulations.

Current limit protection is provided to ensure that the current flow within the transistor inverter does not exceed a predetermined safe level to thereby cause damage to the various components such as the transistor inverters. The current in the primary of the transformer is sensed and representative signal is compared with a reference signal to provide a digital output indicating whether a safe limit has been reached. A logic network then operates on the output signal to shut down or reduce the system operation accordingly. In the event of a shut-down, current decay is accommodated by shutting off only the top transistors in the inverter diagonals so as to thereby allow the remaining current to flow in the bottom transistors and diodes.

In the drawings as hereinafter described, the preferred embodiment is depicted; however, various other modifications and alternate constructions can be made thereto without departing from the true spirit and scope of the invention.

BRIEF DESCRIPTION OF THE DRAWINGS

FIG. 7 shows the digital portion of the protection circuits of the present invention;

DESCRIPTION OF THE PREFERRED EMBODIMENT

Figure 1:
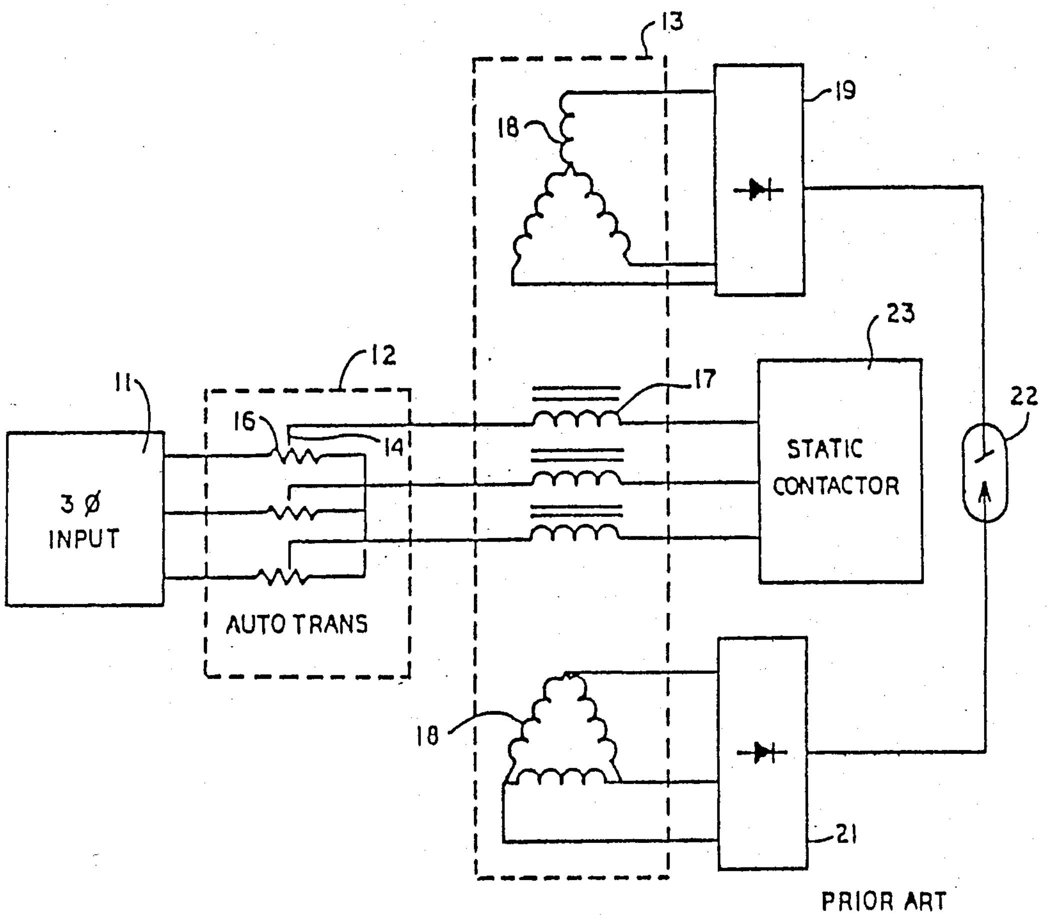
FIG. 1 is a schematic illustration of an X-ray generator system in accordance with the prior art.

A typical prior-art X-ray generator system is shown in FIG. 1 to comprise a three-phase power source 11, connected by way of an autotransformer 12, to the three-phase transformer 13. The autotransformer 12 includes taps 14 that can be selectively varied with respect to the primary coil 16 so as to vary the connection of the primary to the incoming line to thereby compensate for varying line conditions. The power transformer 13 will typically have a Y-primary 17 and a ΔY-connected secondary winding 18, producing an output waveform with either 12 or 6 pulses. The outputs are then connected to full-wave rectifier bridges 19 and 21, which in turn provide high voltage to the X-ray tube 22. The power level to the X-ray tube 22 is varied by way of the variable input/output autotransformer 12, whose primary windings 17 are selectively closed by way of static contactors 23, normally by way of SCR's. Such a conventional system is subject to the various disadvantages discussed hereinabove.

Figure 2:
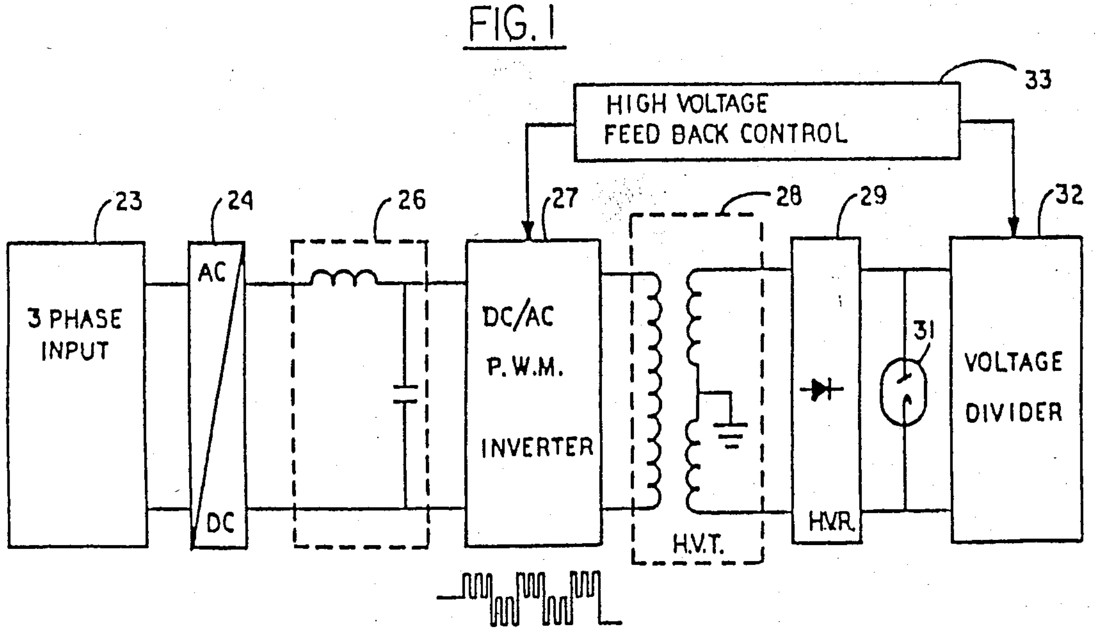
FIG. 2 is a schematic illustration of an X-ray generation system in accordance with the present invention.

The X-ray generator system of the present invention is shown in FIG. 2 to comprise a three-phase power source 23, an a.c. to d.c. three-phase non-controlled rectifier 24, an LC filter 26, and a d.c. to a.c. pulse-width modulator inverter 27 operating at variable high-frequency conditions, i.e., in the range of several kilohertz. The output of the inverter 27 is controlled by way of pulse-width modulation with provisions for varying both the mark-space ratio and the frequency by way of a kVp feedback controller, as will be described more fully hereinafter. The output from the PWM inverter 27 passes to a high-tension transformer 28, through a single-phase rectifier 29 and is finally applied to an X-ray tube 31. The tube 31, which operates at voltage levels up to 150 kV, presents a load of anywhere from 0.1 mA to 1250 mA, depending on the particular application and procedure, and must be capable of providing a wide range of exposure times from 1 msec. to several seconds in order to accommodate the various radiographic applications. The present invention provides for such a wide range of operating conditions and performance parameters by controlling the X-ray output in a fast and accurate manner, as will be described in more detail hereafter. It will be seen by reference to the FIG. 2 that a primary feature of this fast response system is the closed-loop feedback control which senses, by way of the voltage divider 32, the voltage across the X-ray tube 31 and provides a representative signal to the high-voltage feedback control 33, which in turn provides a control signal to the PWM inverter 27.

It should be mentioned here that, while the power source is described as a three-phase input, it may as well be a single-phase input. Since the system of the present invention is designed to operate at frequencies which are substantially higher than those of a conventional generator, the complications of wave-form ripple are substantially reduced. For this reason, where single-phase operation is not practical in a conventional X-ray generator, it is practical when used with the accommodating features of the present invention.

Figure 3A:
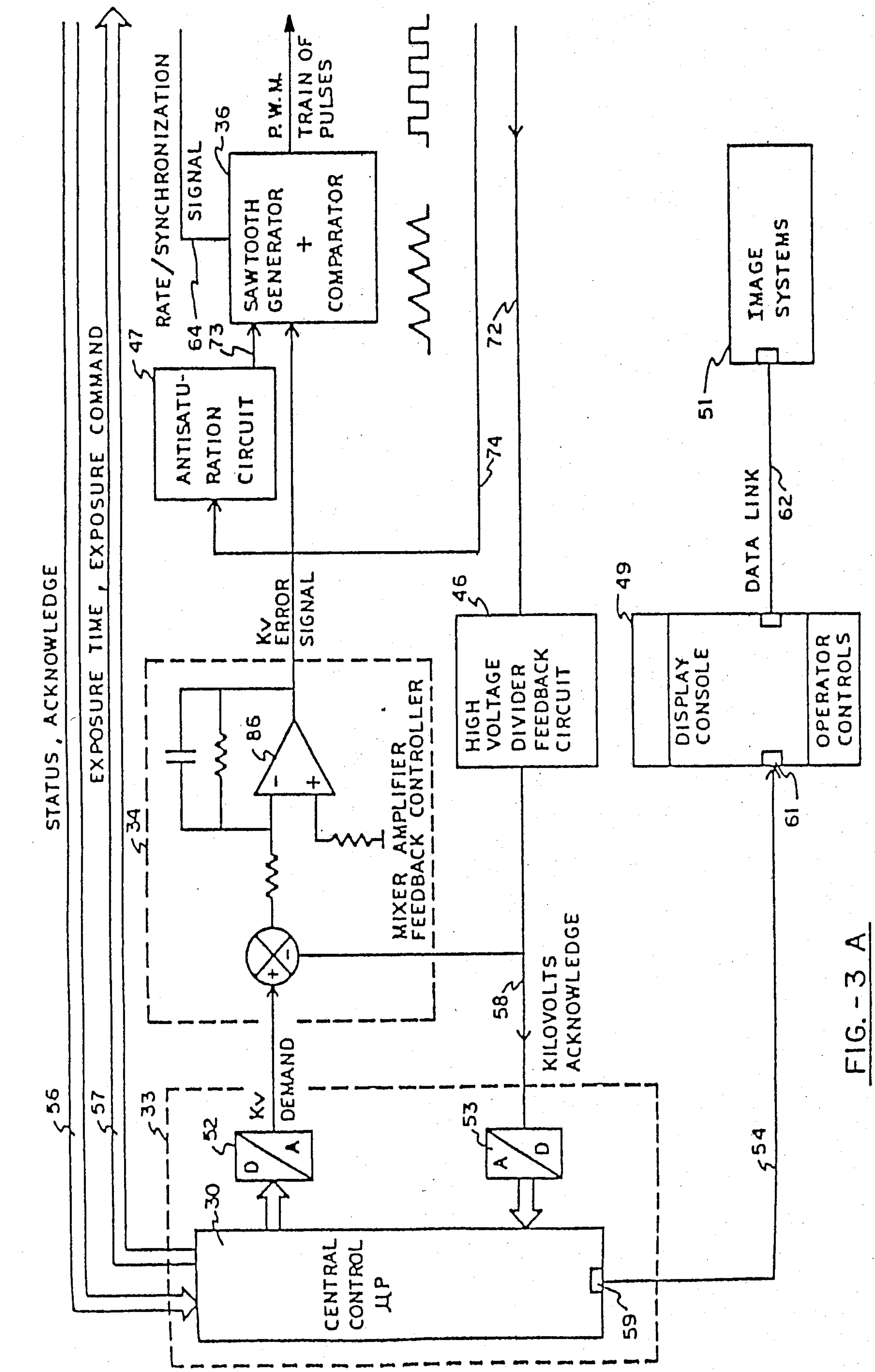
FIGS. 3*a* and 3*b* are schematic illustrations of the voltage feedback and control portion of the present invention in accordance with the preferred embodiment.
Figure 3B:
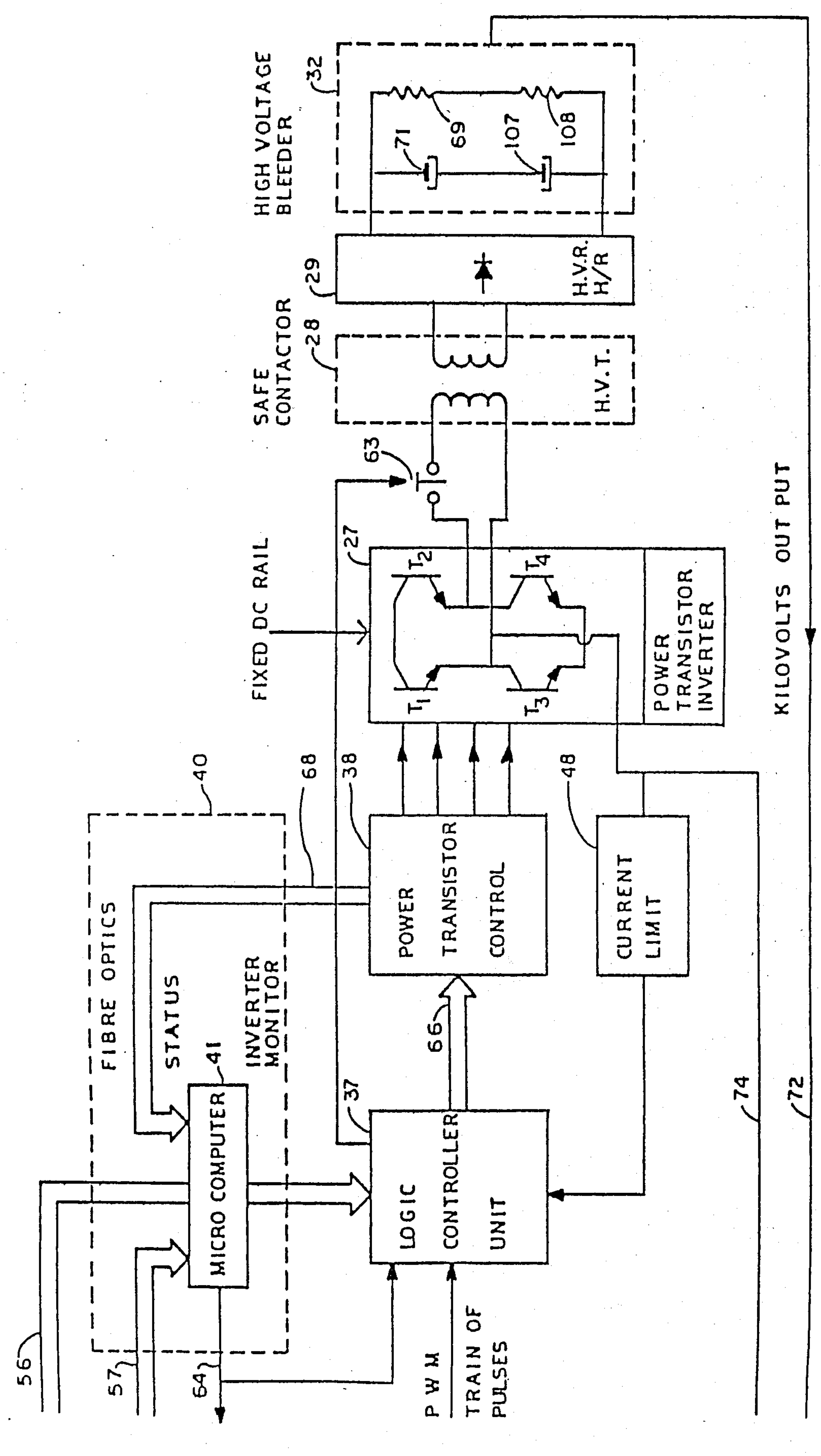

The square-wave pulse-width-modulated inverter and control system of the present invention is shown schematically in FIGS. 3A and 3B as comprising the following elements: a Central Control Microprocessor Kilovolts Demand Control 33, employing a microprocessor 30; a Mixer Amplifier and Feedback Controller 34; a Sawtooth Generator and Comparator 36; a Logic Controller Unit 37; Power Transistor Controllers 38; the square-wave pulse-width modulated transistor inverter 27; an Inverter Monitor 40 with its dedicated microcomputer 41 which controls the interlock for safety signals from the power transistor inverter 27 back to the Logic Controller Unit 37; the high voltage transformer 28; the high voltage rectifier 29; the High Voltage Bleeder 32; a High Voltage Divider Feedback Circuitry 46; an Antisaturation Circuit 47 which works with the error signal and the Sawtooth Generator and Comparator 36; a Current Limit Circuit 48; a Display Console and operator controls 49, with its installed microprocessors; and an Imaging Device 51, which may be of the conventional type. The overall system as shown in FIG. 3 will now be described in general terms, and the individual components will be described in more detail hereinafter.

The overall control system is coordinated by the microcomputer 41 and control microprocessor 30, the inverter microcomputer 41 being dedicated to continuously monitor and check the high voltage power transistor inverter 27 and the central control microprocessor 30 acting to control the demand prior to and during exposure. The control microprocessor 30 also reads the kilovolts coming from the feedback to provide, during exposure, an accurate control of what is happening on the high voltage side. Any of a number of commercially available microprocessors and/or microcomputers may be used with the present invention. For example, the Intel 8085 microprocessor may be used for the central control function, whereas the Intel 8749 microcomputer may be employed for monitoring the inverter operation.

The central microprocessor 30, in response to signals from the Display Console 49, generates the Kilovolts Demand and passes that signal, by way of the D/A converter 52, to the Mixer Amplifier and Feedback Controller 34. The Kilovolts Acknowledge signal comes to the central microprocessor 30 by way of the A/D converter 53. The Kilovolts Demand and Kilovolts Acknowledge signals should be maintained very close together and, in addition to being monitored by the central microprocessor 30 for that purpose, are also used as inputs for protection if, on the high voltage side, an arcing occurs or a component is damaged. In such case, the Kilovolts Demand signal will not be followed by the Kilovolts Acknowledge signal and the central microprocessor 30 will, therefore, shut down the system.

The central microprocessor 30 is connected to Display Console 49 by a data link 54, to the inverter microcomputer 41 by lines 56 and 57 and to the High Voltage Feedback Circuits 46 by line 58. The data handling and communication starts at the Console 49 where the operator enters the exposure times and other parameters. Those parameters are analyzed and controlled by the system microprocessor, such as an Intel 8088 microprocessor, in conjunction with an arithmetic co-processor, such as an Intel 8087, which handles all of the arithmetical calculations for x-ray protection and exposure parameters. Communication between the Console 49 and the microprocessor 30, or between the 8088 and 8085 microprocessors, is made along the data link 54 by the two data link protocol controllers 59 and 61 which, in one embodiment, are Intel 8273 chips. These controllers guarantee a very high reliability in the data transmission in a bidirectional way with cyclic redundancy checkwork, NRZI protection systems. The Console 49 has the further capability of serving another data link 62 to the Image Systems 51 so that the communication is completely digital to provide high reliability during its operation.

The communication between the central microcomputer 30 on the cabinet side and the inverter microcomputer 41 is also done in a bidirectional way by lines 56 and 57. Hence, the operator control state is such that kilovolts and exposure time are being provided to the central control microprocessor 30 and from there to the inverter microcomputer 41, which controls the output voltage during exposure, the inverter operation, and the exposure time, such that, during the X-ray exposure, there are three microprocessors controlling exposure time, (i.e., the centrol control microprocessor 30 and inverter microcomputer 41 on the cabinet side and, as a backup, the Display Console microprocessor 8088 on the console side). Such a combination provides redundant protection against an excessive dose of radiation during exposure.

One advantage of using the closed-loop feedback and the Kilovolts Demand and Kilovolts Acknowledge signals as shown is that in long-term exposures, such as in fluoro operation, should any deviation occur in the high tension feedback or in some of the associated electronic components, the closed-loop feedback will compensate for that automatically. Further, the communication on lines 56 and 57 between the inverter microcomputer 41 and the microprocessor 30 on the cabinet side is done directly by means of the central control microprocessor 30 sending kilovolts and exposure-command and exposure-time commands to the microcomputer 41, while the microcomputer 41 is continuously monitoring the output state and sending a status and acknowledge signal back to the central microprocessor 30. This provides a very simple communication link where, on several redundant levels, it is possible to detect any problem which might occur in the power circuitry to stop the high power inverter in a few microseconds, or to open the safety contactor 63, if it should become necessary.

The Mixer Amplifier and Feedback Controller 34 produces a narrow signal which is the difference between the Kilovolts Demand and the Kilovolts Acknowledge or feedback. The resulting kV error signal is amplified and processed with phase advance and phase lag circuits, to be described more fully hereinafter, to make the system stable. The kV Error signal is then fed, along with a signal from the Antisaturation Circuit 47, to the Sawtooth Generator and Comparator 36. The signal from the Antisaturation Circuit 47 controls the slope of the sawtooth generator so as to prevent the high voltage transformer 28 from reaching a condition of saturation, as will be more fully described hereinafter. The kV Error Signal feeds the Sawtooth Generator and Comparator 36 to produce a PWM train of pulses with a variable mark/space ratio, which in turn is applied to control the output voltage and to adjust it automatically through the closed-loop kilovolt feedback operation. The Sawtooth Generator and Comparator 36 and Logic Controller Unit 37 are controlled by a reset or synchronization signal received every half cycle along line 64 from the dedicated microprocessor 41 to guarantee that the kV Error Signal from the mixer 34 will intersect the sawtooth generator waveform once per half cycle to thereby avoid the possibility of having several intersections which might lead to problems at the power stage circuit.

The Logic Controller Unit 37, which handles all of the system protections and timing, has, by way of fibreoptic line 66, an output which controls the power transistor inverter 27 through the Power Transistor Controllers 38. This Logic Controller Unit 37 also handles the Current Limit 48 output. The Current Limit Circuit 48 is responsive to the inverter current level, detected with a current transformer 67 in series with the primary of the high voltage transformer 28. The sensed current level is compared, in the Current Limit Circuit 48, with a predetermined safe level, and the output of the Current Limit Circuitry 48 is applied to the Logic Controller Unit 37 to cut off the mark/space pulses dynamically if a circuit overload condition occurs. The output from the current transformer 67 is also fed back into the Antisaturation Circuit 47, and its output, in turn, is applied to the sawtooth generator along line 74 to vary the slope dynamically to electronically compensate for saturations in the transformer.

In addition to providing signals to directly control the power transistor inverter 27, the Power Transistor Controller 38, also provides, along line 68, signals indicative of the power supply status on the controllers and of the transistor's status, back to the inverter microcomputer 41 which uses that information to control the Logic Controller Unit 37 such that, should any transistor or power supply fail, the information coming from the Transistor Controller 38 will be fed back, in real-time, into the Logic Controller Unit 37 which will, first of all, stop the inverter and, secondly, will open the appropriate safety contactos(s) 63.

The pulse-width-modulated inverter 27 is comprised of a plurality of transistors shown generally in FIG. 3 as $T_1$–$T_4$, arranged in a full bridge disposition so as to provide alternate conduction through the transformer primary 28 by way of diagonals $T_1$–$T_4$ and $T_2$–$T_3$. The transistors may be used as shown or, alternately, may be used in parallel where the power requirements may require it. One type of transistor that has been found to be useful in the present invention is that identified by the designation WT-5752, which is commercially available from Westinghouse Brake (Westcode) in Chippenham England. The pulse-width modulation is affected by the selective turning on and off of the top transistors $T_1$ and $T_2$ only.

The high voltage transformer 28 is described in U.S. patent application No. 564,602, filed concurrently herewith and incorporated herein by reference. Suffice it to say, the transformer 28 is designed to have a very low leakage inductance so that the square waveform produced in the PWM inverter is pulsed to the secondary of the transformer with very good waveform reproduction. In this way, the drop between pulses is minimized and the ripple, after rectification, is kept to a minimum so as to thereby limit the size of the output filter. This, in turn, facilitates a high reproducibility operation at lower mAs settings. The rectifier 29 is of the conventional single-phase type.

The High Voltage Divider or High Voltage Bleeder 32 is designed to include unique resistive and capacitive electronic circuitry, shown generally as 69, 71, 107, and 108, to improve the response of the transformer 28 to the dynamic variations of the load or source, or to other transient conditions, such that the rise and the fall times are minimized. The output from the High Voltage Bleeder 32 is the Kilovolts Output which feeds, along line 72, to the High Voltage Divider Feedback Circuits 46 in a step-down voltage fashion. That is, since the output from the bleeder 32 is a higher voltage than can be directly applied to the control circuits, there is a need for the voltage to be stepped down in several steps, with different arresters and overvoltage protection methods, to avoid the transmission of high voltage transients from the high tension area, which could damage the control circuits. This circuitry will be described more fully hereinafter.

The operation of the closed-loop kV feedback system is primarily dependent on the Mixer Amplifier and Feedback Controller 34, which produces an error signal equal to the difference between the Kilovolts Demand and the Kilovolts Output. It is necessary for the Controller 34 to (1) be conditioned to the electronic circuitry level through the high voltage divider feedback circuits so that the error signal generates a mark/space train of pulses with the specific ratio depending on the kilovolts' demand, and (2) compensate for the three main variables which may disturb the system operation during exposure, the variables being (a) the fixed d.c. rail which will very with the lines and the line regulation; (b) the variations occurring in the X-ray tube impedance particularly in long-term exposures where the electron cooling phenomena occurs; and (c) the variation on the offsets that the electronic circuitries themselves will provide to the overall system.

ANTISATURATION CIRCUIT AND SAWTOOTH GENERATOR AND COMPARATOR

Figures 4, 5A, 5B:
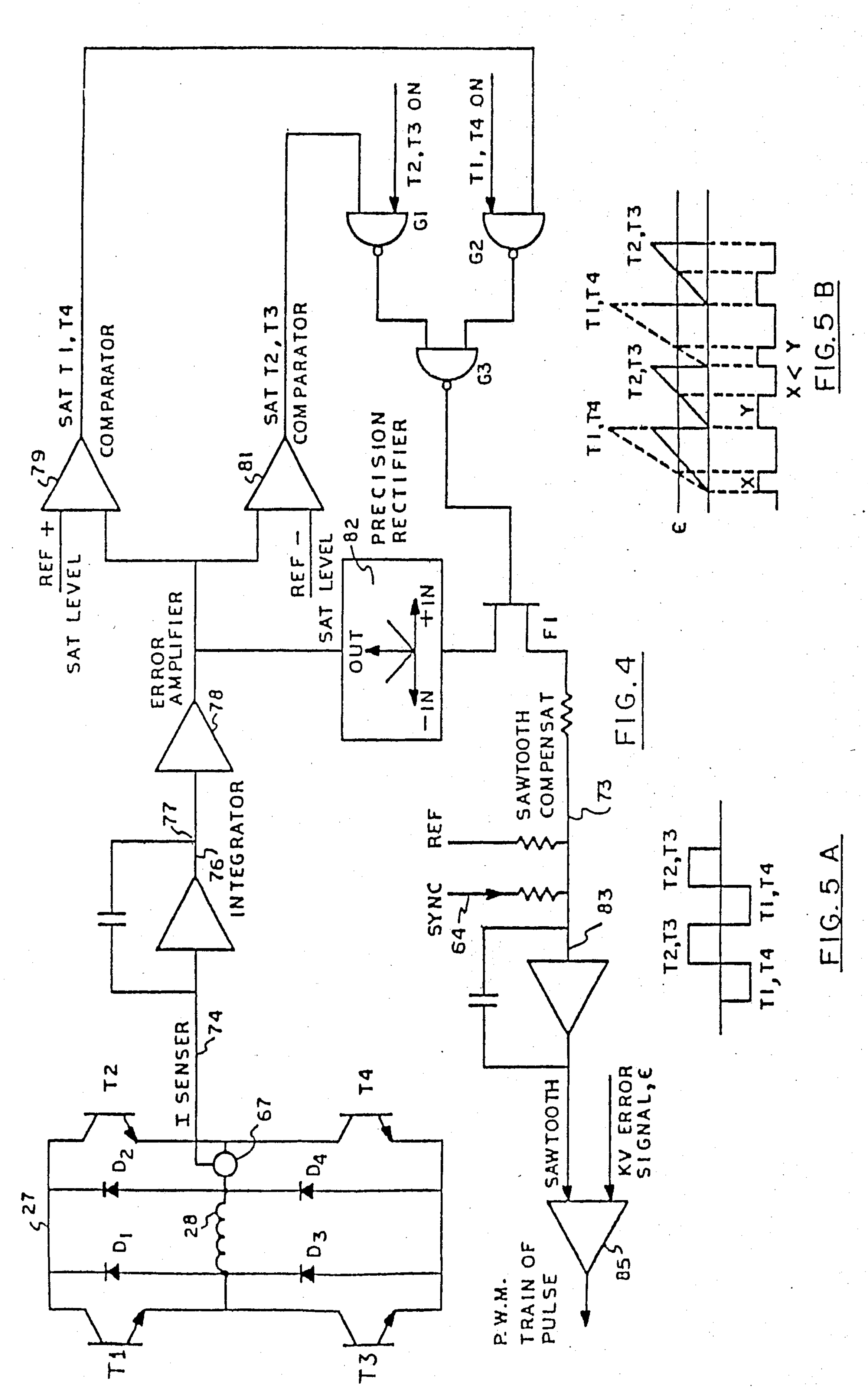
FIG. 4 is a schematic illustration of the antisaturation circuit portion of the present invention.
FIGS. 5*a* and 5*b* show representative pulses that are generated in the control of the inverter of the present invention.

Referring now to FIG. 4, there is shown a schematic illustration of the combination of the Antisaturation Circuit 47 (FIG. 3) and the Sawtooth Generator and Comparator 36 in combination. As is shown in FIG. 3, the Sawtooth Generator and Comparator 36 is responsive to three signals: (1) the synchronization signal which comes in on line 64 to reset the sawtooth range every half cycle; (2) the control signal which is fed, on line 73, directly to the Sawtooth Generator 36 from the Antisaturation Circuit 47; and (3) the Kilovolts Error Signal E from Mixer Amplifier 34. The Antisaturation Circuit 47 is responsive to the current output of the inverter as received along line 74.

Referring now back to FIG. 4, the inverter is shown to include transistors $T_1$–$T_4$ with associated flywheel diodes $D_1$–$D_4$. The current in the inverter or primary of the transformer 28 is sensed by current transformer 67 and is passed on line 74 to an integrator 76 whose output in turn passes on line 77 to an error amplifier 78 whose output is applied to two comparators 79 and 81. These comparators have respective positive and negative reference levels which normally are of very low value, i.e., nearly zero, and fix what is called the admissible saturation level in the transformer. It will be seen that the respective outputs frm the comparators 79 and 81 are applied to NAND Gates G1 and G2, whose outputs are applied to NAND Gate G3. The output from NAND Gate G3 acts to close an FET switch F1 on either one diagonal $T_1$, $T_4$ or the other $T_2$, $T_3$ in the power inverter. A closing of the FET switch F1 will allow the Error Amplifier output signal, which is proportional to the current sensed, to feed a precision rectifier 82 working in the first and fourth gradients which in turn feeds a linear output through the FET switch F1, to the sawtooth generator or compensator. The sawtooth generator is an integrator 83 which is preset by the synchronization signal from line 64 and produces a sawtooth whose slope is set for a zero saturation level constant as shown in FIGS. 5A and 5B and defined by the range of a part of the overall closed-loop feedback system. The sawtooth waveform signal is then applied, along with the kV Error Signal E, to a comparator 85 which responsively generates a PWM train of pulses that controls the inverter.

Should any saturation start to occur, for example, in the diagonal $T_1$, $T_4$ direction, the error amplifier 78 will produce a d.c. level input to the precision rectifier 82 whose output will be linearly proportional to the input. It will be recognized that the precision rectifier 82 is responsive to either positive or negative d.c. volts input from the error amplifier 78, with the sign being dependent on the applicable current direction in the power transistor inverter. Consequently, the magnitude of the particular d.c. saturation level determines the output of the precision rectifier 82, and that output in turn is passed through FET switch F1, if the saturation level reaches above the preset reference levels to correct for the condition. As the saturation occurs, for example, in the diagonal $T_1$, $T_4$, the sawtooth generator will increase the slope on that part of the waveform when the $T_1$, $T_4$ diagonal is conducting, and, as will be seen in FIG. 5B, this increasing of the slope will lead to a decreasing in the mark/space ratio for a given error signal from the feedback, which in alternate cycles will decrease the mark/space ratio on that diagonal and will compensate dynamically for the difference in, say, hysteresis time in the transistors or unbalancements due to local saturations in the core.

Referring back to FIG. 4, in such a saturation condition, the output from the error amplifier will overcome the positive reference value on comparator 79 which in turn will send a command logic signal to NAND Gate G2 to synchronize with the on-time for the $T_1$, $T_4$ diagonal so that, when the $T_1$ $T_4$ diagonal of transistors is turned on, the waveform of the sawtooth generator is automatically increased in slope and the mark/space ratio is diminished. In this way, the saturation level is dynamically and electronically compensated for by way of a closed-loop proportional control, i.e., the mark interval X is reduced and the interval Y is increased.

The advantage of this electronic dynamics FET compensation is that it operates continuously once the current level on the dc transformer 67 exceeds a preset reference saturation level, and in a proportionally controlled way, compensates by a suitable reduction in the mark/space ration, when an inverter diagonal moves toward saturation.

LOGIC CONTROLLER UNIT

Figure 6:
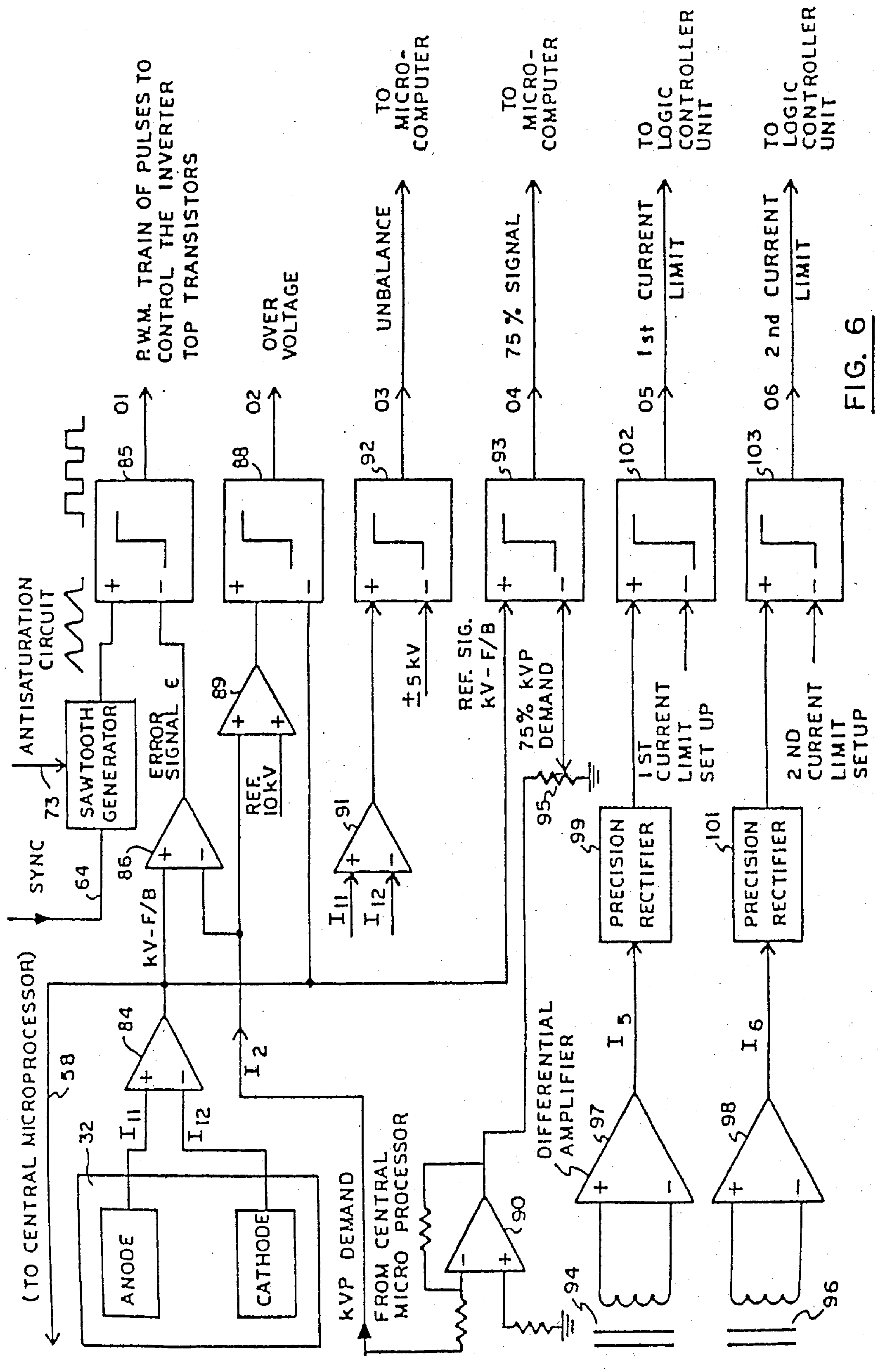
FIG. 6 shows the various protection circuits that are employed in the present invention.

The Logic Controller Unit 37 works in conjunction with the microcomputer 41, and will now be described in terms of both its analog and its digital functions. The analog functions are shown in FIG. 6 and the flow of logic signals are shown in FIG. 7. Both the analog and the digital signal processing circuits result in outputs which are fed to the microcomputer 41, which in turn controls the overall inverter functions, protections, and performance operation.

Referring now to FIG. 6, there is shown on the left a series of input signals from $I_{11}$ to $I_6$ and on the right a series of output signals from $0_1$ to $0_6$ which are, respectively, applied to and result from the protection circuits in the system to control the overall system operation on the high voltage side. To begin with, the anode and cathode-to-ground signals, $I_{11}$ and $I_{12}$, respectively, come from the voltage divider or bleeder 32 as will be seen by reference to FIGS. 3B and 8. These signals are added together in an operational amplifier 84 whose output is representative of the kV high voltage output. That output is fed back to the master or central microprocessor 30 in the cabinet to check, as is shown in FIG. 3, the kilovolt value in real-time operation. The output of operational amplifier 84 is fed into the positive side of an operational amplifier 86 where it is compared with the Kilovolts Demand signal $I_2$ which comes from the central microprocessor 30 in the power cabinet through a D/A converter 52 as shown in FIG. 3. The operational amplifier 86 calculates the error signal E of the kilovolts feedback and that signal is applied to the comparator 85 where it is compared with the output from the sawtooth generator as shown in FIGS. 4 and 5 to provide an output $0_1$ which is a pulse-width-modulated train of pulses which controls the inverter.

In FIG. 6, there are several different kinds of protective circuits which protect not only the high voltage side including the transformer 28 but also the power transistor inverter 27 and the related control circuitry which may be effected by the arcing, flashes, or transients which commonly come from the high voltage side and are typical in all X-ray machines.

Comparator 88 output $0_2$ provides an over-voltage protection which: (1) is very fast in operation, and (2) is responsive to any small transient which might occur on the high voltage side. Referring now to FIG. 6, the kV demand $I_2$ from the central microprocessor on the cabinet is fed to the positive input of the operational amplifier 89 and is added to a reference signal which is considered to be the maximum allowed overvoltage, for example, 10 kilovolts. The output from operational amplifier 89 is a signal which is the demand of kV plus 10 kilovolts, and that signal is then subtracted, or compared, in comparator 88 with the high voltage kV feedback signal which comes from operational amplifier 84 to feed the negative input of comparator 88. The output $0_2$ from the comparator 88 will be logic 1 or logic zero, and the jump from logic zero to logic 1 is an over-voltage indication which will force the dedicated inverter microcomputer 41 to shut down the system through a software subroutine. This over-voltage feature, once it is detected, trips or stops the inverter in a time as short as 10 microsec., which is 1000–2000 times faster than an over-voltage response in a conventional system. This feature will therefore protect and increase the life of an X-ray tube, the high tension rectifier 29, and the high voltage transformer 28 which in turn will have to withstand the overvoltage for only a few microseconds.

Another protection feature shown in FIG. 6 is that for unbalance between the difference of voltage between the anode-to-ground and the cathode-to-ground in the X-ray tube high voltage circuit. This is accomplished through operational amplifier 91 having inputs $I_{11}$, $I_{12}$, which inputs are subtracted to provide an output which is applied to a comparator 92 and compared with a 5 kilovolt reference signal. Should the unbalance between anode to ground and cathode to ground be greater than 5 kilovolts, comparator 92 will trip off, and the output $0_3$ will immediately cause the inverter microcomputer 41 to shut down the system. This protection circuit has the capability of detecting a possible manufacturing defect in the secondary coils, i.e., should the secondary number of turns be in error so as to cause a difference of more than 5 kilovolts, then the error will be detected during a test by way of the circuit just described. Also, in the dynamic performance and operation of the X-ray generator, should there be a significant deviation in the anode source or the cathode source, or should another unbalance be caused by failure of one of the high voltage diodes, or by a partial short circuit of a secondary coil, for example, then the output difference will be greater than 5 kilovolts and this abnormality, which might be a fault situation, will be detected through the output of the window comparator 92, and a representative logic signal will be sent through the data link to the operator console. In this way, the protection of comparator 92 detects any failure, damage, or deviation, which might occur either in the secondary transformer coils, in the high tension rectifier, in the output filter, or in the X-ray tube itself.

Another protection circuit is that relating to the fact that, when a film is exposed to X-rays, most of the exposure is made when the power level is above 75% of the kV Demand level. A comparator 93 is provided and has as inputs the kV feedback signal at the positive input and, at the negative input, a signal representative of a 75% kV demand level which is derived by the operational amplifier 90 and voltage divider 95. When the power transistor inverter 27 is turned on, the kV output starts to rise, and when it reaches the 75% kV demand, the comparator 93 trips on to provide an output $0_4$, to thereby indicate to the dedicated microcomputer 41 that the 75% level of the kV demand has been reached and that the exposure time should now be counted. A related protective function of this circuit is that of detecting, during the rise time of the kilovolts, any fault in either the power transistor inverter 27 or in the integrated electronics, so that, if after a specified interval of time, for example, 2.5 msec., the kV feedback voltage does not reach the 75% of demand, it is assumed that there is a problem in the power transistor inverter 27, its peripheral electronics, the high voltage transformer 28, the rectifier 29, the filter, or the feedback circuits. This signal is then used to safely trip off the system.

The three protection circuits described above all relate to the sensing of deviations in the voltage levels. There is also a need to provide for the sensing of, and protection against, the occurrence of excessive current levels. For that purpose, there are provided, as shown at the bottom of FIG. 6, two identical circuits called First Current Limit and Second Current Limit which are intended for redundancy but which have the same set-up levels. The reason for using redundant circuits is that, if an overload occurs, the inverter 27 will try to introduce higher current, and, therefore, there must be some way of preventing the inverter from doing that. Such an overload might occur from a flash in the tube or might occur because there is an arc in the transformer or a short circuit in the output diodes, for example. Further, if the Antisaturation Circuit 47 fails and the transformer 28 moves toward saturation, then the current will increase, and that increase in current will tend to collapse the rail voltage to thereby create a potential problem in the output. Thus, the Current Limit network consists of two redundant circuits with the same set-up levels to make sure that the system will be protected against failure of one of the Current Limit channels.

In operation, the current limit is initiated through a pair of current transformers 94 and 96 having ferrite cores and being placed in series with the primary of the transformer 28 on the inverter output. The respective outputs are fed to the differential amplifiers 97 and 98 which have very high common mode rejection to avoid any noise such as may come from the inverter, from radiation, etc. The outputs $I_5$ and $I_6$ are applied to the respective precision rectifiers 99 and 101 which produce DC level signals proportional to the respective currents, with nearly no delay. This is to be contrasted with the conventional use of an RC filter approach where the delay can be so long as to make the system not fully safe in terms of full response for the current limit operation. The outputs of the precision rectifiers 99 and 101 are applied to the positive inputs of the respective comparators 102 and 103. The two-current limit levels are applied to the negative inputs of the respective comparators 102 and 103. In operation, if the current exceeds the set up level of either of the comparators 102 or 103, then the outputs, $0_5$ or $0_6$, will trip off and will be applied, as will be shown in FIG. 7, to the Logic Controller Unit 37 to control the power transistor inverter 27 such that the transistors will be selectively cut off, and consequently, the current will automatically decrease and delay, and turn on again in the next half cycle and so on.

It is important to note, here, that the Current Limit operates by cutting off only the top transistors $T_1$ and $T_2$, (refer to FIG. 4) so as to allow the energy stored on the transformer windings to recirculate on the complementary bottom diode of the top transistor which has been conducting and the bottom transistor on the diagonal. This guarantees that the inductive current or inductive energy 0.5 $L_1^2$ will decay on the loop which consists of the bottom flywheel diode, transformer winding, and the bottom transistor. Such a decay loop will be more effective than if all four transistors are turned off, in which case, the inductive energy has to be dissipated from the bottom flywheel diode, through the transformer to the diagonal top flywheel diode. In this loop, the energy will be fed back on to the dc rail and will decay much faster and will allow the bottom flywheel diode and the bottom transistor to conduct. The rapid decay of the circulating energy fed back through the bottom and top diodes in the diagonal to the fixed dc rail will then produce a faster tripping action of the current limit which in turn can switch the transistors on and off at a very high and uncontrolled frequency. For this reason it has been found experimentally that the procedure of cutting off only the top transistors leads to a better system performance operation, allowing a longer decay time in the current when it is recirculating on the bottom transistor and diode through the primary of the transformer, thus avoiding high-frequency spurious operation of the inverter.

Referring now to the digital operation of the protection system as shown in FIG. 7, the heart of the system is the dedicated inverter microcomputer 41 which synchronizes the overall system in terms of ramping up the sawtooth generator, synchronizing with the error signal, controlling the output transistors, and communicating forward and back to the central control microprocessor 30 to acknowledge any potential failure detection and also to record which kind of error, if any, has been detected on the output circuit. There are several signals which come from the microprocessor 30 to the microcomputer 41. First of all, there is an Exposure Command signal, originating with the microprocessor 30, which tells the microcomputer 41 to start an exposure. Before that occurs, the microcomputer 41 checks the overall system status by means of different signals to ensure that: (1) the power supply status and the four transistors are in the proper condition; and (2) the Power Transistor Controllers 38 are in a proper condition prior to the commencement of an exposure start.

In addition to the Exposure Command signal from the microprocessor 30, the microcomputer 41 also receives an Exposure Time Signal, and a Phase Voltage Control Signal. The Exposure Time signal defines the length of the exposure time, whereas the Phase Voltage Control signal is used to produce output pulses with a very small pulse width in order to compensate at the output for low-energy exposures. In this way, the pulse width can be as small as a few microseconds in duration to guarantee tight control through the closed-loop feedback operation. The well-known phase voltage control technique synchronizes the diagonal bottom transistor to the top one so that both transistors on the same diagonal are conducting for an amount of time which is defined by the closed-loop feedback operation, once the top transistor has been fixed in pulse width for a minimum of time, typically 20 microsec, to guarantee that the R-C snubber network is fully discharged before turning off the output transistor. Therefore, should the energy required for exposure be of a low level, the phase voltage controller adjusts and produces a very small pulse width on the output of the power transistor inverter diagonal to achieve high accuracy, low energy exposure times.

The 75% Output Kilovolts signal comes from the protection circuitry of FIG. 6 and indicates to the dedicated microcomputer 41 that the output voltage has reached 75% of kVp Demand and that the microprocessor 30 should start to count exposure time. For that purpose, the microcomputer 41 will send back to the central microprocessor 30 a signal called Exposure Start. The microprocessor 30 will then start to count exposure. For redundancy, this will also be done by the console microcomputer through the cabinet/console data link.

Should an over-voltage or unbalancement condition occur during the exposure, there will be a signal which causes the microcomputer 41 to stop the output to the inverter transistors $T_1$–$T_4$.

In addition to the protective features described above, there is a set of logic AND gates G4, G5, G6, and G7 which control the output transistors $T_1$–$T_4$ by driving the Power Transistor Controllers 38 as described in U.S. patent application Ser. No. 564,602, filed concurrently herewith and incorporated herein by reference. Generally, G4 controls the top transistor $T_1$, G5 controls $T_2$, G6 controls $T_3$, and G7 controls $T_4$ so that the primary incoming signal to G4 is the drive signal from the microcomputer 41 relating to $T_1$, which enables G4 and allows the modulation signal to modulate the output on G4 to transistor $T_1$. Similarly, the microcomputer 41 provides drive signals relating to $T_2$, $T_3$, and $T_4$ to gates G5, G6, and G7, respectively.

There are another two inputs into gates G4, G5, G6, and G7 which, if absent, can stop the modulation. One such absence of a signal (STATUS PS) would be caused by a failure of a transistor driver power supply.

The other signal which, if absent, can act to stop the operation of the transistors $T_1$–$T_4$ is one referred to as short-circuit protection or shoot-thru protection, which is the fibre optics interlock between one transistor, say, $T_1$, and its complementary transister $T_3$, so that if transistor $T_3$ is malfunctioning and is still on, transistor $T_1$ cannot be switched on because, if that happens, vertical shoot-thru will occur to damage the second transistor. This protection feature is bidirectional so that, if $T_3$ transistor breaks down, $T_1$ cannot be switched on, and conversely, if $T_1$ breaks down, the interlock controls $T_3$ before it is switched on. The same holds true with the other vertical arrangement of power transistors $T_2$ and $T_4$.

A signal that is applied to only the top two transistors $T_1$ and $T_2$ is the LINE PROTECTION signal. The absence of this signal is caused by a failure of the kV output protection system which is fed by three different signals on gate G10. This protection line is provided by an AND gate G10 which is switched by the Second Current Limit level, the Overvoltage protection, or the Unbalance protection so that the output from G10 is the protection signal which can act, through gate G4 or G5, to stop the driving of transistors $T_1$ and $T_2$. Any of the Second Current Limit Overvoltage, or Unbalance networks will disable the output of transistors $T_1$ and $T_2$ to avoid a potential fault in the power output stage.

The bottom transistors $T_3$ and $T_4$ are stressed less heavily because they conduct for a full half cycle of waveform from the high tension transformer. They are controlled by the signals coming out from the microprocessor $T_3$ and $T_4$ terminals, which are applied to respective gates G6 and G7.

Also acting on only the top two transistors $T_1$ and $T_2$ is the current limit feature represented by the "MODULATE" signal to the gates G4 and G5. To effect this, the microcomputer 41 generates a synchronization signal which is applied to flip-flops 104 and 106, which are controlled by both that synchronization signal and the secondary inputs, i.e., the Second Current Limit signal on flip-flop 104 and the G9 AND gate output signal on flip-flop 106. The G9 gate is controlled by the First Current Limit and the output of an OR gate G8, which in turn is fed by the pulse-width modulation train-of-pulses signal and the synchronization signal, which is a 20 microsec. monostable pulse generated from the output of the flip-flop 106. This minimum pulse is generated in order to make sure that the RC series circuit on the output of the transistor inverter is completely discharged before the transistor is turned off, to thereby protect against second breakdown of the transistors.

In operation, the output from flip-flop 104 is a Second Current Limit synchronized action, assuming that the current limit level is tripped off, and flip-flop 106 generates the modulation pulse through the First Current Limit and in conjunction with the 20 microsec. monostable minimum pulse turn on to guarantee the RC discharge. Following through, the microcomputer 41 generates the main transformer frequency waveforms which are immediately applied to the bottom transistors $T_3$ and $T_4$ and that square wave is synchronized with a pulse-width modulaton train-of-pulses signal through gates G8 and G9 and flip-flop 104 and flip-flop 106 to present to the output of the top transistors $T_1$ and/or $T_2$ pulse-width modulation train of pulses, synchronized with a rise time of the square wave generator and at the end of it. The microcomputer 41 also generates at that time, i.e., at the end of every half period, a signal to switch over from diagonal 1, i.e., transistors $T_1$ and $T_4$, to diagonal 2, i.e., transistors $T_2$ and $T_3$. That diagonal change guarantees the successful complete switch off of the conducting diagonal transistors. And finally, the microcomputer 41 also generates a Fault Error and an Error Code, which are sent back to the control microprocessor 30 to signal when one of the potential failures has occurred, and of which kind of failure it is. The binary number will be decoded and forwarded by way of the data link back to the Display Console 49.

In this way, the microcomputer 41 provides a very high degree of flexibility in controlling the power inverter, in generating waveforms, in talking back to the central cabinet microcomputer, in receiving commands, and in providing intelligence to the system for making decisions, such as, if any failure occurs from the power circuit, which is the most likely problem.

HIGH VOLTAGE BLEEDER AND HIGH VOLTAGE DIVIDER FEEDBACK CIRCUIT

Figure 8:
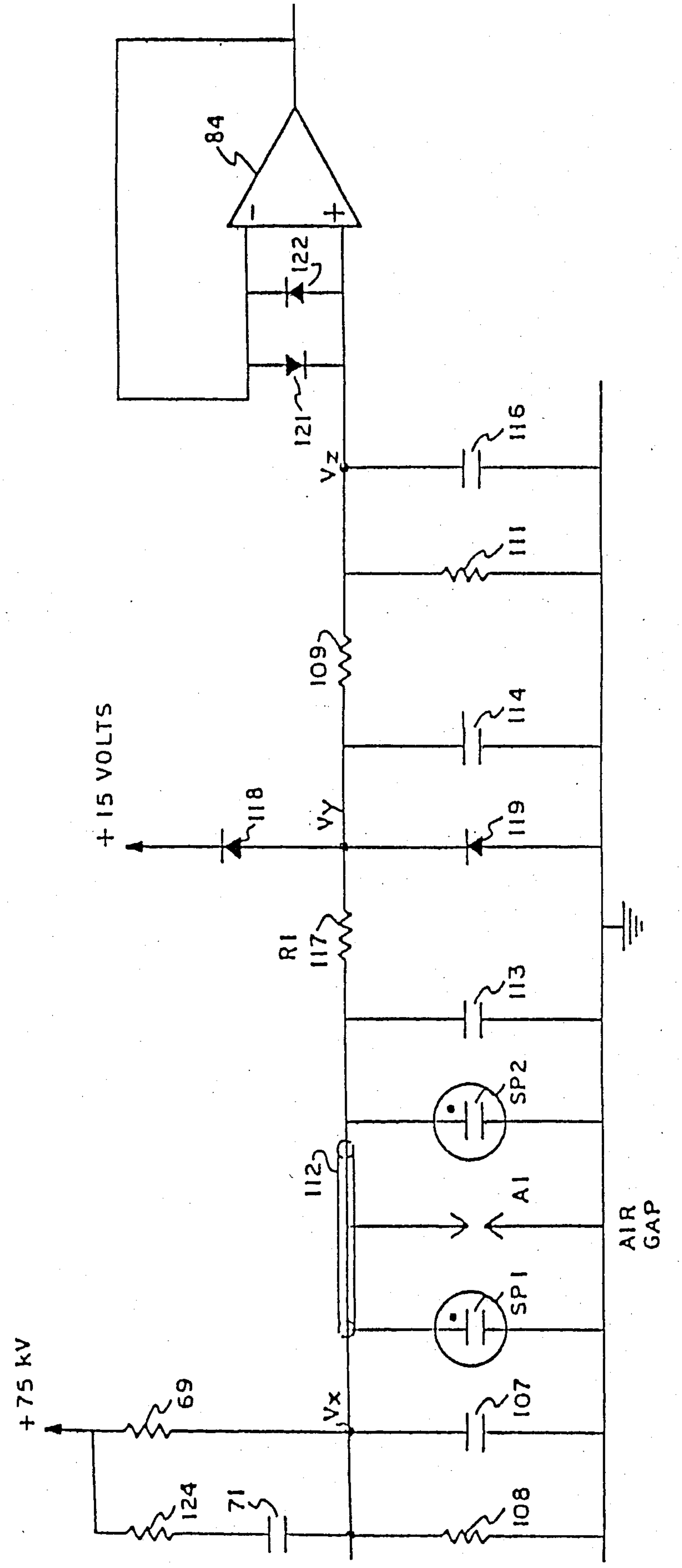
FIG. 8 is a diagram of the voltage divider circuitry in accordance with the preferred embodiment of the present invention.

The High Voltage Bleeder 32 and the High Voltage Divider Feedback Circuit 46 of FIG. 3 are shown in greater detail in FIG. 8. The High-Voltage Bleeder 32 offers protection against overvoltages which might occur on the high voltage side and be reflected back into the electronic control circuit. A unique feature is that the necessary output capacitor 71 from the d.c. side of the high tension rectifier 29 is used, in a secondary role, to replace a very large number of parts of a conventional bleeder. The only additional components that are required are a bottom capacitor 107 and a bottom resistor 108 as shown in FIG. 8, thereby drastically reducing both the physical size of the bleeder and the inherent inaccuracies and higher costs that result from using a large number of elements as is done in conventional bleeders. Typically, for a lower power generator (in the range of 0.25 mAS) the filter capacitance has to be minimized e.g., in the present embodiment of the invention the capacitance of capacitor 71 is about 5 nano farads, from anode to ground. There is an identical capacitor and an identical bleeder system from the cathode to ground. The purpose of using the bottom capacitor 107 is to obtain a low voltage output signal, i.e., in the range of 5–15 volts, that can be fed back to the control circuits without causing harm thereto.

An associated problem that must be dealt with is that of having large voltage spikes when the tube arcs, a phenomena which might appear either between the anode to ground, the cathode to ground, or the anode to cathode. Obviously, unless some protection is provided, these overvoltages can damage the control circuits. The approach that the present invention uses to protect the system is to provide a top-down voltage cascade filtering action to guarantee that, for the worst case, the control circuits connected to the operational amplifier 84, for example, will not have overvoltages which could damage the system during a high-voltage transient. To provide this protection, the voltage divider requirement for the nominal maximum 75 kilovolts is derived at Vx by the ratio of capacitor 107 to capacitor 71, multiplied by 2,000, leasing to a value for capacitor 107 in the range of 10 microfarad, and a voltage Vx equal to 37.5 volts. The voltage at point $V_y$ in the voltage divider circuit, as applied to the operational amplifier 84 input, is divided by resistors 109 and 111 to give a $V_z$ voltage of about one-half the value of $V_y$, or a voltage in the range of 4.99 v. or nearly 5 v., for example. This 5 v., when considered in conjunction with the voltage from the cathode-to-ground bleeder, which is identical, will give a total voltage divider signal of 10 v. for a 150 kilovolts output level.

Having divided the voltage, the cascade filtering now comes into play. First of all, if a transient occurs and is above a predetermined level, an arrestor SP1 will act as a protection against the spike. In such case, another element that contributes to the filtering function is the coaxial cable 112, with its inherent characteristics, which will tend to reduce the radiated noise coming from the high-voltage side before it arrives at the air gap A1. A second arrestor SP2 is provided as shown to provide added assurance of protection. Adding further to the cascade filtering concept, capacitors 113, 114, and 116 and resistor 117 are provided. There is another filtering effect between the resistor 117 and the capacitor 114. And, finally, there is a filtering effect from Vy and Vz due to resistor 109 and capacitor 116, which operate in conjunction with the divider action of the resistor 109 and 111 as mentioned above. The cumulative effect is that the voltage Vz is a nominal value of 5 v. for 75,000 volts on the anode-to-ground voltage. Also included in the circuit of FIG. 8 are diodes 118 and 119 which, depending on the polarity of the spike, will either divert that spike to the 15 v. power supply through diode 118, or from Vy to ground through diode 119. The operational amplifier 84 is further protected against overvoltages on its input terminals by diodes 121 and 122.

The combined effect of cascading the protections provided by (1) the filtering combination of elements, including arrestor SP1, coaxial cable 112, capacitor 113, air gap A1, arrestor SP 2, and the voltage divider on resistances 109, 111, and 117; (2) the filtering combination of resistor 117 and capacitor 114; and (3) the filtering combination of resistor 109 and capacitor 116, when combined with the capability of returning energy to the capacitors of the supply through diodes 118 and 119, provides assurance that whatever the level of a sharp spike which may occur on the high voltage, there will not be sufficient energy provided to the electronic control circuit to cause damage.

Referring now in more detail to the design of the High Voltage Bleeder 32, its transient response is dependent on the combined impedance of the capacitor 71, resistor 69, and the capacitor 107 with its equivalent resistor in Vx, whereas, in a steady-state condition, its accuracy is dependent on the resistor 69 and equivalent resistor in Vx. A damping resistor 124 of a relatively low value is provided to attenuate the possible extra ripple oscillation on capacitor 71 which may be generated by its series inductance. For this reason, the high voltage capacitor 71 should preferably have a low inductance value, typically less than 100 nanohenrys. The relationship between resistors 69 and the equivalent resistor between 108 in parallel with the combination of 117, 109, and 111 in series, and capacitors 71 and 107 is given by the time constants which have to be equal and also by the fact that the required voltage, or respective voltage of Vx, should be no greater than 40 v. (as required by Underwriter Laboratories ) for 75 kilovolts maximum, anode-to-ground voltage. It should be mentioned here that the adjustment on the setup of the bleeder is very straightforward, with the only required compensation being that of the capacitor 107 for the value of the tolerence that capacitor 71 can have, typically on the order of 5%. This single adjustment compares very favorably with conventional bleeders which typically require many adjustments because of the large number of components that are involved.

Another advantage of the present bleeder is that, since the number of components has been minimized to two resistors and two capacitors, from the high voltage side down to the point Vz of 37.5 v. potential, the possibility of cumulative errors has been minimized. The required tolerance on the resistors is not very tight since the number of resistors is only two, and this leads to a very simple, low cost, highly accurate way of making a bleeder with fast transient response.

Normally, conventional bleeders using only resistors do not have good transient response and fast rise, whereas in the present system, operating at a high frequency with very sharp rise provides a good transient response in order to accommodate the closed-loop feedback voltage control. Further, it provides for operation at a higher band width to thereby improve the system response.

MIXER AMPLIFIER AND FEEDBACK CONTROLLER

Figure 9:
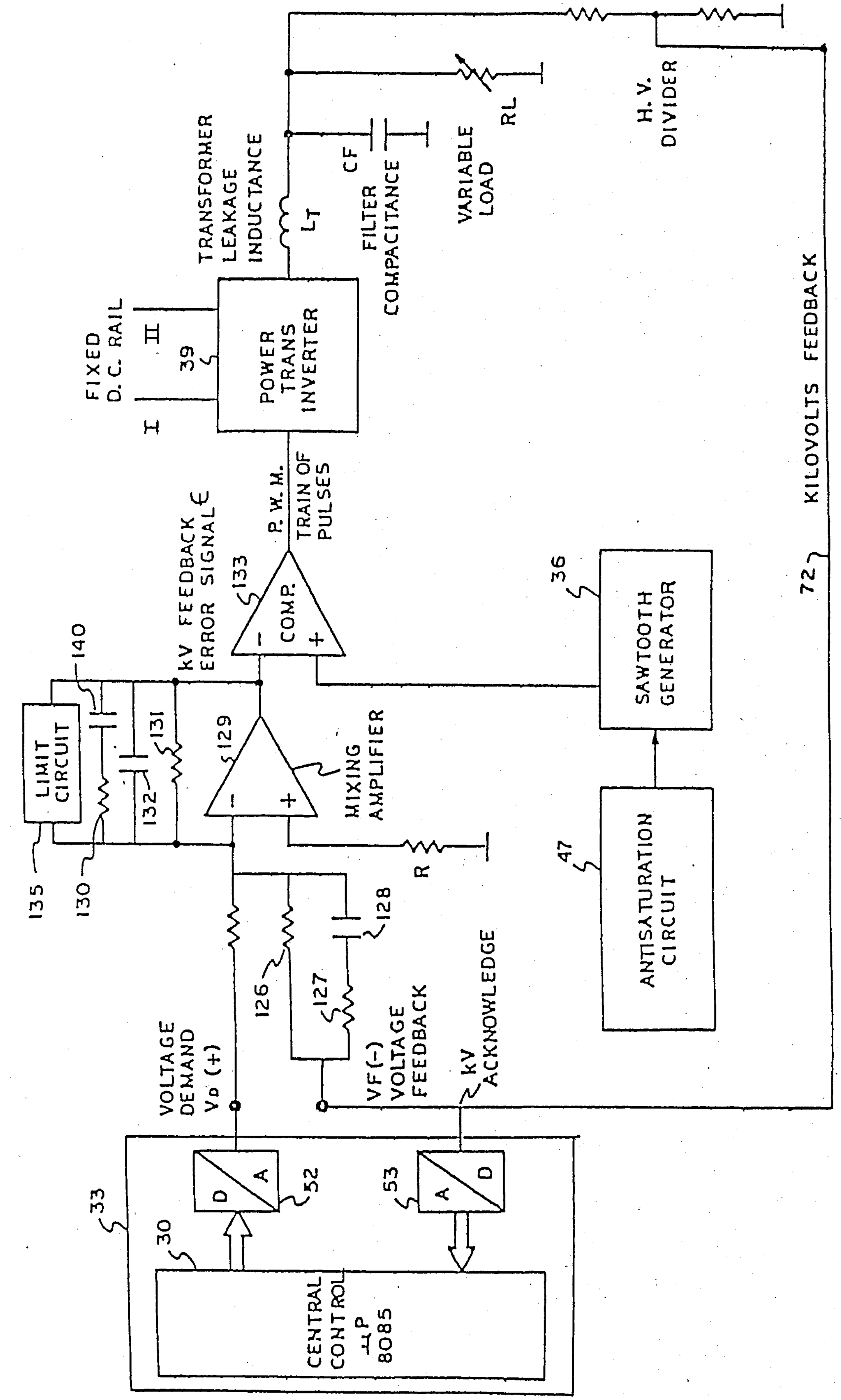
FIG. 9 is a schematic illustration of the feedback control portion of the present invention, including the mixer amplifier and its associated phase-advance network.

The high voltage feedback control system is shown in FIG. 9 and includes the well-known provision for generating a variable Voltage Demand, a low electronics level signal on the order of 0–10 v., which in the present invention is produced through the digital-to-analog converter 52 by the central microprocessor 30. The Kilvolts Feedback signal coming back from the output along line 72 is converted in the analog-to-digital converter 53 and provided to the same microprocessor 30 to acknowledge, in real-time operation, that the system is working correctly and that the voltage feedback follows the voltage demand. The preferred power stage as shown in FIG. 9 includes, first of all, the power transistor inverter 39 which operates from one of two fixed transformer taps I and II to be able to work on the required very wide kilovolt range from 24 kilovolts (in mammography) to 150 kilovolts (in radiography). From the output of the power transistor inverter there is shown in FIG. 9 an equivalent circuit for the high voltage side, referred to herein as the primary side, where the main components are: the transformer leakage inductance and the associated series inductance $L_T$ the capacitor filter $C_F$ which, with respect to the primary, is calculated by multiplying the high voltage value by the square of the turns ratio of the transformer, thereby resulting in a very large value; and the variable load $R_L$, with respect to the primary, which can vary over a very wide range (typically from 1250 mA down to 0.1 mA, a 15,000 to 1, or possibly greater load power variation). There is also shown the high-voltage divider previously described, which provides the Kilovolts Feedback signal for operation of the voltage feedback Mixing Amplifier Controller 34 and the central microprocessor 30.

One of the primary features of the closed-loop feedback control system is the voltage feedback phase advance, which is accomplished by the combination of resistor 126, resistor 127, capacitor 128, and the phase lag of the mixing amplifier 129, brought about by the time constant of feedback resistor 131 and capacitor 132, to cooperatively produce a kV Feedback Error signal, which varies during the rise time period and which, under steady-state conditions, can be considered as a d.c. signal to be compared with a sawtooth generator 36 to provide the pulse-width modulation train of pulses on the output of the comparator 133.

It should be mentioned here that the above-described Antisaturation Circuitry 47 is also a part of the closed-loop feedback kilovolts loop because when dynamically changing the slope of the waveform from the sawtooth generator, it is also varying the effective gain of the overall loop controller. Even though the variations in the Antisaturation Circuit 47 are small and are dynamically changing according to the level of saturation that the transformer itself can reach, the variable gain introduced into the loop is another important feature to be taken into account for the stability and good performance opertion of the system. The purpose of the lag network in the loop is to filter the noise in the error feedback signal. To achieve an optimum performance, the lag network has to be minimized to improve the bandwidth of the system, the short pulse response, and the feedback tracking. The present lag network is characteristically defined by the time constant combination of resistor 131 and capacitor 132, as well as by the time constant of the load filter determined by the values of $R_L$ and $C_F$. But, since the $R_L C_F$ time constant is variable and as explained above, can typically change from 15,000 to 1, the phase lag introduced on the mixing amplifier 129 by means of resistor 131 and capacitor 132 has to compensate, in terms of control and stability, for the potential wide load variations which are common in X-ray generator machines. On the other hand, the combination of resistance 131 and capacitance 132 has to provide a minimum time constant to make sure that the feedback system can respond to exposure times as short as 1 millisec.

In order to get a fast system response in the feedback of the mixing amplifier 129, there is included a commercially available limit circuit 135 whose function is to limit the maximum output of the mixing amplifier 129 to a level of 10 v. This 10 v. level is the same amplitude as the sawtooth generator output so that the maximum output from the mixing amplifier 129 does not exceed the sawtooth generator output level. This relationship avoids saturation of the mixing amplifier, which could lead to a slower response, particularly during the latter part of the rise time period. A second function of the phase lag system is to compensate for the noise introduced by the phase advance feature such that, above a predetermined frequency, the phase lag system will minimize the noise effect to the system. During the rise time the phase advance effect provided by resistors 126, 127 and capacitor 128 will clamp the overshoot to a predetermined level at the end of the rise time. It will also improve the response of the system to dynamic variations on the load, or to variations in other parameters, such as the d.c. rail voltage level, which can affect the kilovolts. In this way, the phase advance controls the overshoot during the rise time and provides a ramping action. From the control point of view, what it does is to reduce the energy stored during the rise time by the transformer and the output d.c. filter to thereby control the overshoot. The primary disadvantage of using the phase advance feature is the inherent increase in noise signal on the mixing operational amplifier output, but, as explained above, this is compensated for frequencies above the cut-off frequency so that the a.c. ripple increase being produced by the phase advance is effectively cancelled by the above-described phase lag network and by an associated transitional phase lag circuit comprising the serially connected resistors 130 and capacitor 140 to compensate for dynamic noise, to thereby provide an acceptable noise level in an improved system with a high gain and good stability. The bandwidth of the system is preferably in the range of 1–1.2 kilohertz, and the switching frequency of the transformer is typically in the range of 6 kilohertz or above so that both cut-off frequencies on the phase advance and the transitional lag are well below the transformer switching frequency to thereby compensate for the a.c. ripple increase which is produced by the phase advance feature. The stability of the system is indicated by the Nichols' Chart shown in FIG. 10 which shows an overall gain margin of about 20 db and a phase margin of 70°. The linearity and control stability margins of the system are, therefore, very good.

A better understanding of the present system can be had by reference to some of the considerations given to the various design and performance features. For example, it should be recognized that during the rise time period there are conflicting interaction requirements for, on the one hand, having a high current flow to ensure a fast rise time and, on the other hand, to limit the current flow to avoid an overshoot and the need for oversized components. During the rise time, the current tends to flow very heavily to magnetize the transformer and charge up the output filter capacitor 69 and is only limited by the transformer leakage inductance which, in turn, and by design, is preferably minimized to achieve a very good signal waveform reproduction between the primary and the secondary. The size of the d.c. output filter in an X-ray generator is arrived at by a compromise between the requirements for low mAs to be achieved, the desired inverter switching frequency, and the permitted output voltage ripple. A feature of the present invention is to increase the frequency during the rise time interval so as to achieve a faster rise time with less current limiting and to thereby obtain a waveform that is very close to a square wave.

In addition to the above requirements, there is a need to limit the current flow to a level which can be met by the power transistor inverter 27 and its associated control devices. Further, the current flow and associated rise time must be limited in order to avoid an overshoot at the end of the rise time. For these reasons, the current has to be controlled during the rise time but at the same time, in order to obtain favorable results with X-ray procedures, and especially for short exposures, the system must achieve a reasonable rise time in the range of 0.5 to 1.5 millisec. This is accomplished by operation of the variable increasing mark/space ratio feature and by operating at higher frequencies than at steady-state operation as described above.

Another aspect of the current level interaction phenomenon explained above is that, during the rise time, the mixing amplifier 129 is in saturation and, during that saturation interval, some type of control has to be applied to ensure that the system will recover rapidly from transformer core saturation and that control is maintained during that time interval. As explained above, this control is established by inserting the output limiting circuit 135 on the feedback of the mixing amplifier 129 which prevents the error signal from going to extreme positions where it could be a long time before the capacitor 132 recovers to allow the error signal to be within the sawtooth generator intersectional limits to thereby quickly remove the mixer amplifier from saturation in order to achieve a good control at the end of such rise time interval. At the end of that rise time, and even during rise time, the Antisaturation Circuit 47 has to be matched to make sure the transformer 28 gets out of saturation because the dynamic asymmetry of the mark/space ratio or volts per second areas are applied to the inverter 27 and transformer 28 during such rise time.

It will be recognized that the variable increasing mark/space ratio during the rise time can be accomplished by controlling the voltage demand slope by way of the microprocessor 30 through the D/A converter 52 to ensure that the small pulses at the beginning of the rise time will, in conjunction with the current limit on the power inverter, limit the current and also control the rise time interval.

Figure 11A:
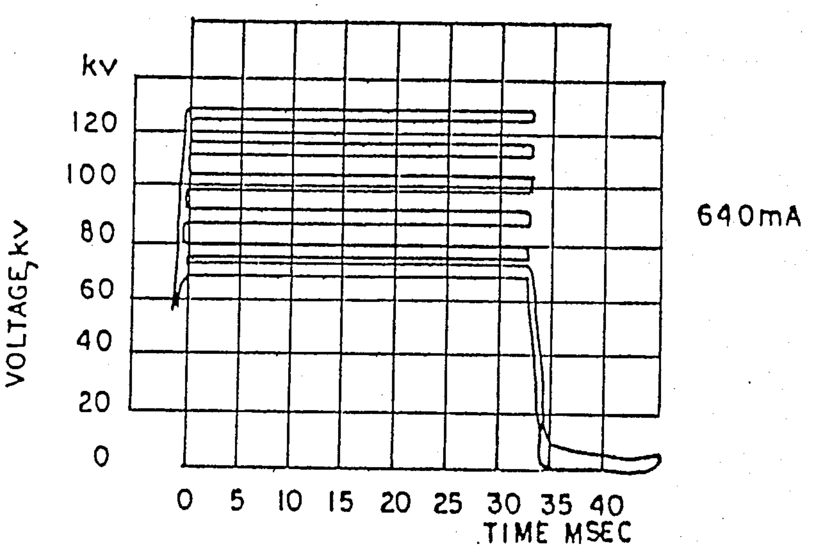
FIGS. 11*a*–11*f* are oscilloscope tracings which show the performance characteristics of a present invention.

FIGS. 11*a*–11*f* illustrate the performance of the present system when operating within various parameters with an MX-100 X-ray tube manufactured by General Electric Company. FIG. 11*a* shows a typical exposure time of 32 millisec. with a current load of 640 mA for different kilovolt levels of 55, 60, 70, 80, 90, and 100 kilovolts. It will be seen that, first of all, the rise time is very fast, i.e., within 1 millisec. Secondly, there is a very high linearity during the rise time and the overshoot is tightly controlled at the end of the rise time because of the phase advance compensation. During the steady-state operation, the output ripple is seen to decrease with the output voltage so that the mark/space ratio increases with increases in the voltage. However, the ripple is minimal in each case.

Figure 11B:
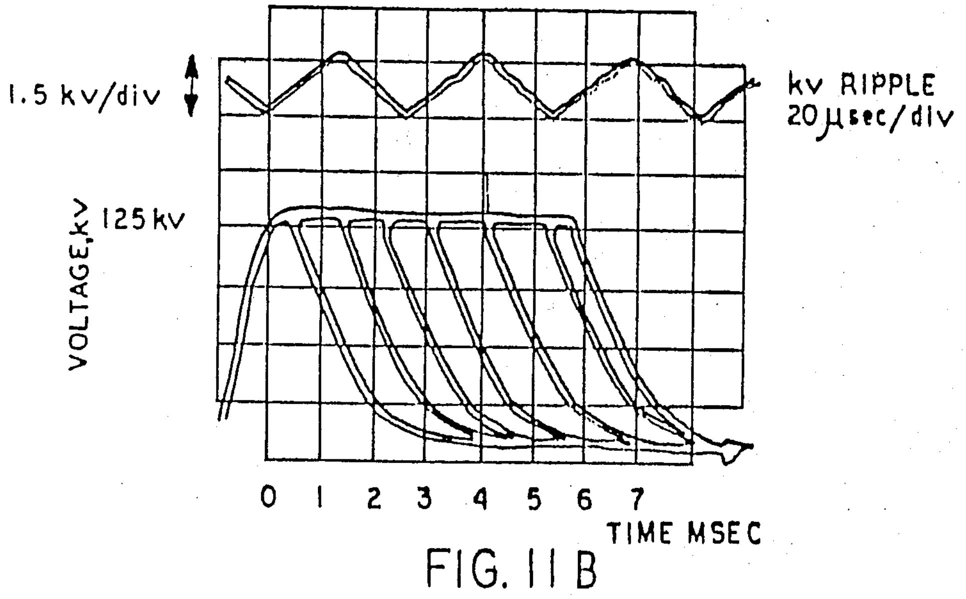

FIG. 11*b* shows exposure times of 1 millisecond and upward, when operating at voltage and current levels of 125 kV and 400 mA, respectively. One thing which is illustrated by this figure is the very fast effect of the feedback circuit. The flat top on the kilovolts waveform demonstrates that the feedback operates in less than 1 millisec. This figure also shows, during the rise time period, several indications of where the current limit function operates to control the storing of energy on the filter capacitor and transformer during the rise time interval to thereby prevent an overshoot. It will be recognized that the operational parameters are typical for X-ray generators working with automatic exposure control at very low mAs, where the reproducibility in conventional generators is very difficult to achieve due to the wide variation in load. The present invention achieves good performance under such conditions by controlling the kilovolts in a very fast closed-loop operation which assures no overshoot, a flat top, and a fast response.

Figure 11C:
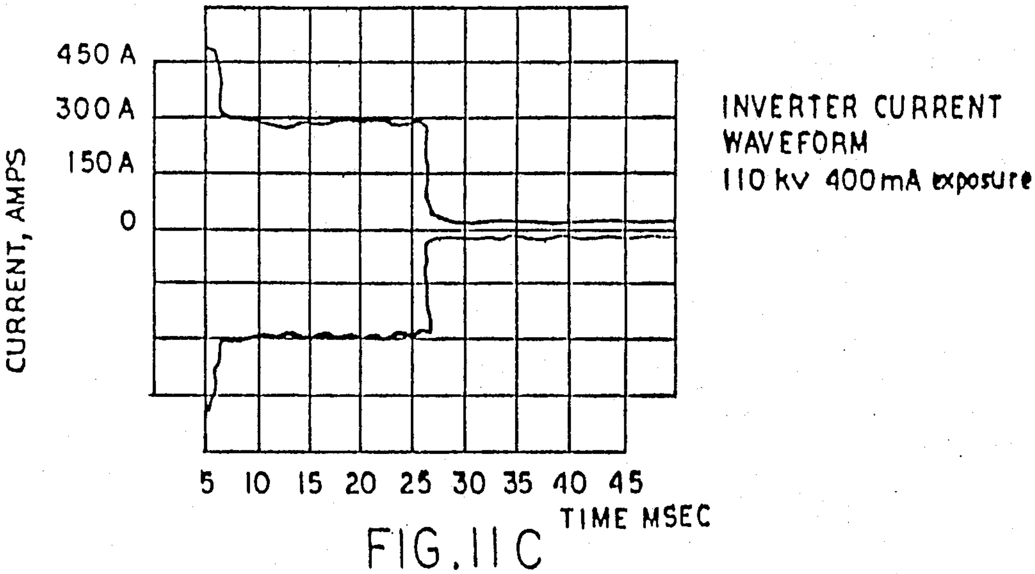

FIG. 11*c* shows an exposure at 110 kilovolts, 400 mA, and shows the current waveform on the inverter. This figure clearly illustrates the two different intervals. The first interval, during the non-linear rise time period, shows the current which is allowed to flow at a level higher than the steady-state level to achieve a fast rise time. It further shows a very symmetrical wave form both during the rise time and during the steady-state operation. This is indicative that, because of the operation of the Antisaturation Circuit 47, there is no saturation phenomenon in the transformer. This figure also shows that the transition between the rise time interval and the steady-state condition is done smoothly and fast, at the end of the phase advance operation and at the top reaching of the kilovolts.

Figure 11D:
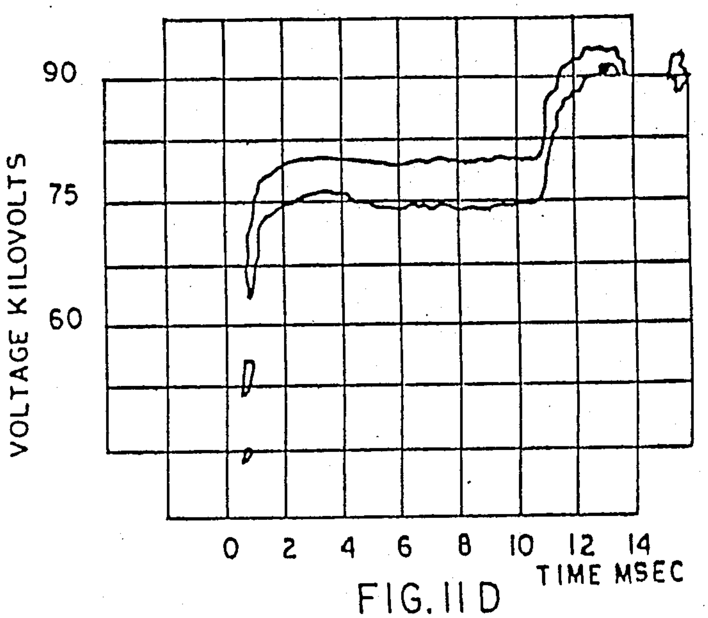

The kV step response performance is illustrated in FIG. 11*d* which shows a 200 mA, 75 kilovolts waveform with a 15 kilovolts step superimposed. As can be seen, there is no overshoot and the settling time is very fast (on the order of less than 1 millisec). It appears to be a first order system (i.e., $1/1+ST$) where the phase lag and the lead networks are predominant.

Figure 11E:
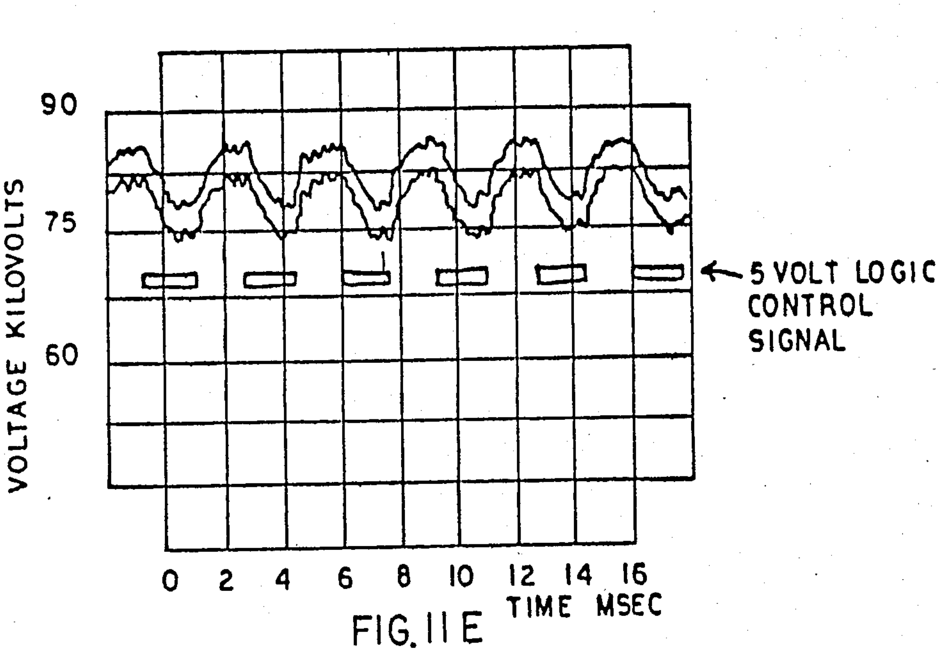

FIG. 11*e* shows the same waveform but at a higher frequency and superimposed with a 7.5 kVp step to show the kilovolts frequency response. The bottom waveform is the clock generator which produces the variable transitional demand.

Figure 11F:
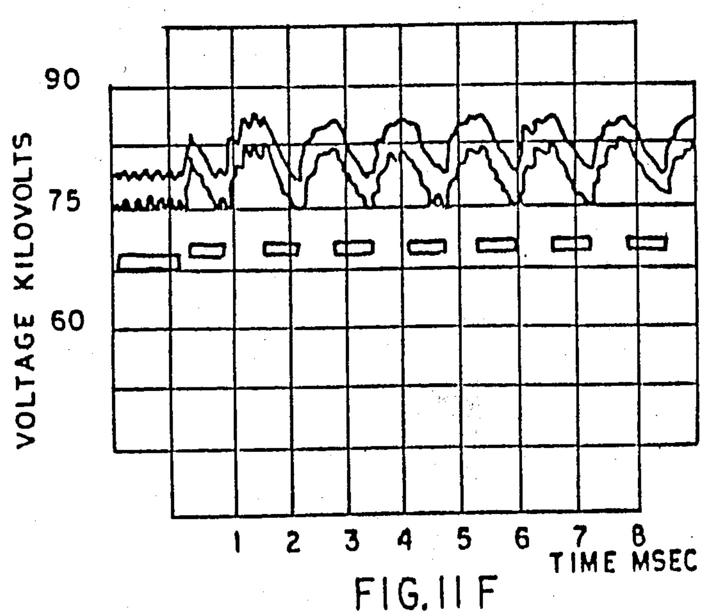

FIG. 11*f* is similar to FIG. 11*e*, at 75 kVp with 7.5 kVp superimposed, but the time scale is different and the frequency is now 5.5 kilohertz.

Figure 10:
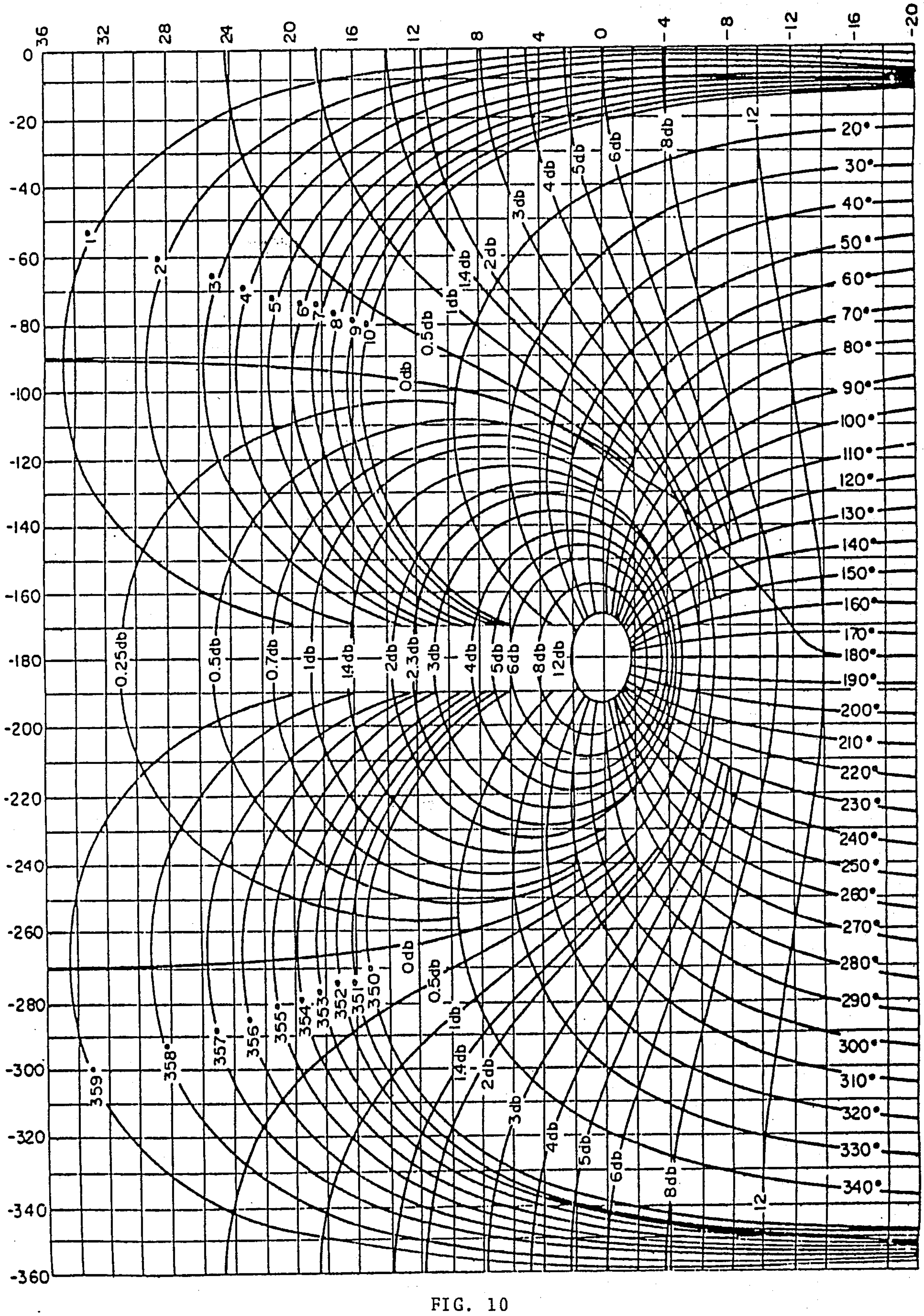
FIG. 10 is a Nichols chart graphic illustration of the kilovolts feedback of the present invention.

From the performance data shown in FIGS. 10 and 11, the conclusions that can be drawn regarding the voltage feedback controller are as follows: (1) there is substantially no overshoot over the wide range of techniques employed in the X-ray generator; (2) there is very good tracking at least up to 5.5 kilohertz; (3) there are no unstabilities but, rather, very good linearity and reproducibility; and (4) the behavior is that of a first order system ($1/1+ST$).

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

What is claimed is:

1. A control system for an x-ray generator system of the type having in serial relationship a DC power supply, an inverter, a high voltage transformer and a rectifier for supplying power to an x-ray tube, the inverter including a plurality of controllable switching elements for controlling current in a primary winding of the transformer, said system comprising:

a. a current transformer connected in series circuit arrangement with the primary winding of the high voltage transformer for generating a signal representative of the magnitude of current in the primary winding;

b. a differential amplifier connected to said current transformer for converting said current representation signal to a single ended reference signal;

c. a precision rectifier connected for receiving and converting said reference signal to a DC level signal proportional thereto;

d. means for comparing said DC signal to a predetermined threshold signal for generating an inhibit signal when the current in said primary winding exceeds a value corresponding to said threshold signal; and e. logic means responsive to said inhibit signal for selectively inhibiting operation of predetermined ones of the switching elements of the inverter.

2. The system of claim 1 and including a second current transformer connected in series circuit arrangement with a primary winding of the high voltage transformer, said second transformer providing a second signal representative of current in the primary winding, and means for comparing said second signal to a second predetermined threshold value and for inhibiting operation of said selected ones of the switching elements when said second signal exceeds said second threshold.

3. The control system of claim 1 wherein the inverter comprises four switching elements arranged in a four-way bridged configuration forming at least first and second current paths through the primary winding, one switching element in each current path being operated in a pulse-width modulation mode to effect current control, said inhibit signal being applied only to terminate operation of said pulse-width modulated elements.

* * * * *